US012812318B2

(12) United States Patent
Couleaud et al.

(10) Patent No.: US 12,812,318 B2
(45) Date of Patent: Nov. 24, 2026

(54) SYSTEMS AND METHODS TO ADJUST SOUND SPATIALIZATION

(71) Applicant: Adeia Guides Inc., San Jose, CA (US)

(72) Inventors: Jean-Yves Couleaud, Mission Viejo, CA (US); Charles Dasher, Lawrenceville, GA (US); Cato Yang, San Jose, CA (US)

(73) Assignee: Adeia Guides Inc., San Jose, CA (US)

( * ) Notice: Subject to any disclaimer, the term of this patent is extended or adjusted under 35 U.S.C. 154(b) by 127 days.

(21) Appl. No.: 18/903,854

(22) Filed: Oct. 1, 2024

(65) Prior Publication Data

US 2026/0095712 A1 Apr. 2, 2026

(51) Int. Cl.
*H04S 7/00* (2006.01)

(52) U.S. Cl.
CPC ........... *H04S 7/301* (2013.01); *H04S 2400/11* (2013.01)

(58) Field of Classification Search
CPC ......... H04S 7/301; H04S 2400/11; H04S 7/00
USPC .................... 381/56, 58, 300, 303, 307, 356
See application file for complete search history.

(56) References Cited

U.S. PATENT DOCUMENTS 8,932,134 B2 1/2015 Andall
9,426,598 B2 8/2016 Walsh et al.
10,123,140 B2 11/2018 Tan et al.
10,136,234 B2 11/2018 Di Censo et al.
10,264,385 B2 4/2019 Freeman
10,299,060 B2 5/2019 Satheesh et al.
11,184,726 B2 11/2021 Hartung et al.
11,736,877 B2 * 8/2023 Jarvis .................. H04R 29/008 700/94
2005/0031129 A1 2/2005 Devantier et al.
2007/0133813 A1 6/2007 Morishima
2009/0123007 A1 5/2009 Katayama
2015/0016642 A1 1/2015 Walsh et al.
(Continued)

FOREIGN PATENT DOCUMENTS

WO 2023/025695 A1 3/2023

OTHER PUBLICATIONS

U.S. Appl. No. 18/903,841, filed Oct. 1, 2024, Jean-Yves Couleaud.
(Continued)

*Primary Examiner* — Yosef K Laekemariam
(74) *Attorney, Agent, or Firm* — HG LAW LLP

(57) ABSTRACT

Systems and methods for automatically calibrating sound in real-time based on changes in the environment that exceed a threshold are described. An initial calibration of sound is performed to establish a baseline for a space and recorded in a spatial sound map. The space is automatically monitored to detect any changes in the environment that exceed a threshold. If change that exceeds a threshold is detected, then recalibration is performed automatically using data from the spatial sound map. The recalibration performed factors in the changes that took place in the environment, including any changes to the listening position, to deliver optimal sound quality to the listening position. Systems and methods also describe monitoring sound characteristics in a live event. Upon receiving feedback from users in the event, auto-calibrating sound based on the feedback and/or notifying the performers to perform the sound adjustments.

20 Claims, 15 Drawing Sheets

(56) References Cited

U.S. PATENT DOCUMENTS

| | | | | |
|---|---|---|---|---|
| 2015/0208190 | A1* | 7/2015 | Hooks | H04R 1/40 381/303 |
| 2015/0382128 | A1 | 12/2015 | Ridihalgh et al. | |
| 2018/0242098 | A1 | 8/2018 | Pratt et al. | |
| 2018/0352358 | A1 | 12/2018 | Choisel et al. | |
| 2019/0069112 | A1* | 2/2019 | Pearson | H04R 1/406 |
| 2019/0394599 | A1 | 12/2019 | Shi et al. | |
| 2021/0385602 | A1 | 12/2021 | Po et al. | |
| 2025/0287164 | A1 | 9/2025 | Shintani et al. | |
| 2026/0095716 | A1 | 4/2026 | Couleaud et al. | |

OTHER PUBLICATIONS

"Amazon Astro, Household robot for home monitoring, with Alexa, Includes 30-day trial of Ring Protect Pro", Amazon, Retrieved on Oct. 24, 2024, 16 pages, Retrieved from https://www.amazon.com/Introducing-Amazon-Astro/dp/B078NSDFSB/ref=sr_1_2.
"AV Receiver Market Size Worth $2.61Bn, Globally, by 2028 at 3.9% CAGR—Exclusive Report by The Insight Partners", PR Newswire, Mar. 14, 2022, 5 pages.
"Empowering Schools with STEM & Robotics Education Program", Proven Robotics, Retrieved on Oct. 24, 2024, 11 pages, Retrieved from https://provenrobotics.ai/.
"Global Digital Audio Workstation Market Size, Share,", Spherical Insights, Retrieved on Oct. 24, 2024, 29 pages, Retrieved from https://www.sphericalinsights.com/reports/digital-audio-workstation-market.
"Home Theater Speaker Guide", Dolby, Mar. 26, 2020, 1 page, Retrieved from https://www.dolby.com/siteassets/about/support/guide/setup-guides/7.1-virtual-speakers-setup/7_1_virtual_speaker_setup.pdf.
"Optimizing the speaker settings automatically (YPAO:", RX-V685, Retrieved on Oct. 24, 2024, 7 pages, Retrieved from https://manual.yamaha.com/av/18/rxv685/en-US/311793035.html.
"Personal Robots Market Research Report", Prescient Strategic Intelligence, Retrieved on Oct. 24, 2024, 8 pages, Retrieved from https://www.psmarketresearch.com/market-analysis/personal-robot-market.
Guttenberg, S. et al., "How to use your AV receiver's speaker calibration", CNET, Feb. 26, 2009, pp. 1-6, Retrieved from https://www.cnet.com/culture/how-to-use-your-av-receivers-speaker-calibration/.
Lahemer, E. S.F. et al., "An Audio-Based SLAM for Indoor Environments: A Robotic Mixed Reality Presentation", Sensors, vol. 24, No. 9:2796, Apr. 27, 2024, pp. 1-35.
Roman, I. R. et al., "Spatial Scaper: A Library to Simulate and Augment Soundscapes for Sound Event Localization and Detection in Realistic Rooms", ICASSP 2024—2024 IEEE International Conference on Acoustics, Speech and Signal Processing (ICASSP), 2024, pp. 1221-1225.
Schmidt, R. et al., "Multiple emitter location and signal parameter estimation", in IEEE Transactions on Antennas and Propagation, vol. 34, No. 3, Mar. 31, 1986, pp. 276-280.
Sun, H. et al., "Active Noise Control Over 3D Space with A Dynamic Noise Source", ICASSP 2024—2024 IEEE International Conference on Acoustics, Speech and Signal Processing (ICASSP), 2024, pp. 1236-1240.

* cited by examiner

SYSTEMS AND METHODS TO ADJUST SOUND SPATIALIZATION

FIELD OF DISCLOSURE

Embodiments of the present disclosure relate to calibrating or otherwise adjusting sound from an audio source in response to determining a change in an environment and/or a change in a listening position.

BACKGROUND

To improve a listening experience, sound and its attributes or characteristics may be calibrated. For example, if a person is sitting in their living room and listening to or consuming music through a set or speakers, or watching their favorite movie, then calibrating sound helps to enhance their listening experience. As such, it is common to calibrate sound to obtain the best sound quality for the listener.

Calibrating sound, for example, in a living room may result in achieving the optimal audio experience. This may involve ensuring that speakers are properly positioned and adjusted, so the sound propagation is directed at the person consuming the sound. If a person consuming the sound wants a surround sound experience, then positioning and calibrating sound becomes even more important to achieve such surround sound result.

Although techniques exist for calibrating sound, the current calibration techniques fall short and have several drawbacks. One such drawback is that current techniques do not consider changes in the environment surrounding the audio source, such as changes in locations of furniture or people in the room. Not considering the surroundings may result in sound output that may not be clear or impactful.

Yet another drawback in current calibration techniques, such as in advanced systems like Dolby Atmos which has several speakers in the system, is that speaker placement is often performed through trial and error techniques that require manual adjustments.

Yet another drawback is that current calibration techniques may call for or rely on manual adjustments when there is a change in the speaker location making it cumbersome to perform recalibration.

As such, there is a need for dynamic systems and methods that enhances and automates the calibration of sound or otherwise change audio settings, such that changes in environment are considered to consistently deliver a higher quality sound to listeners.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
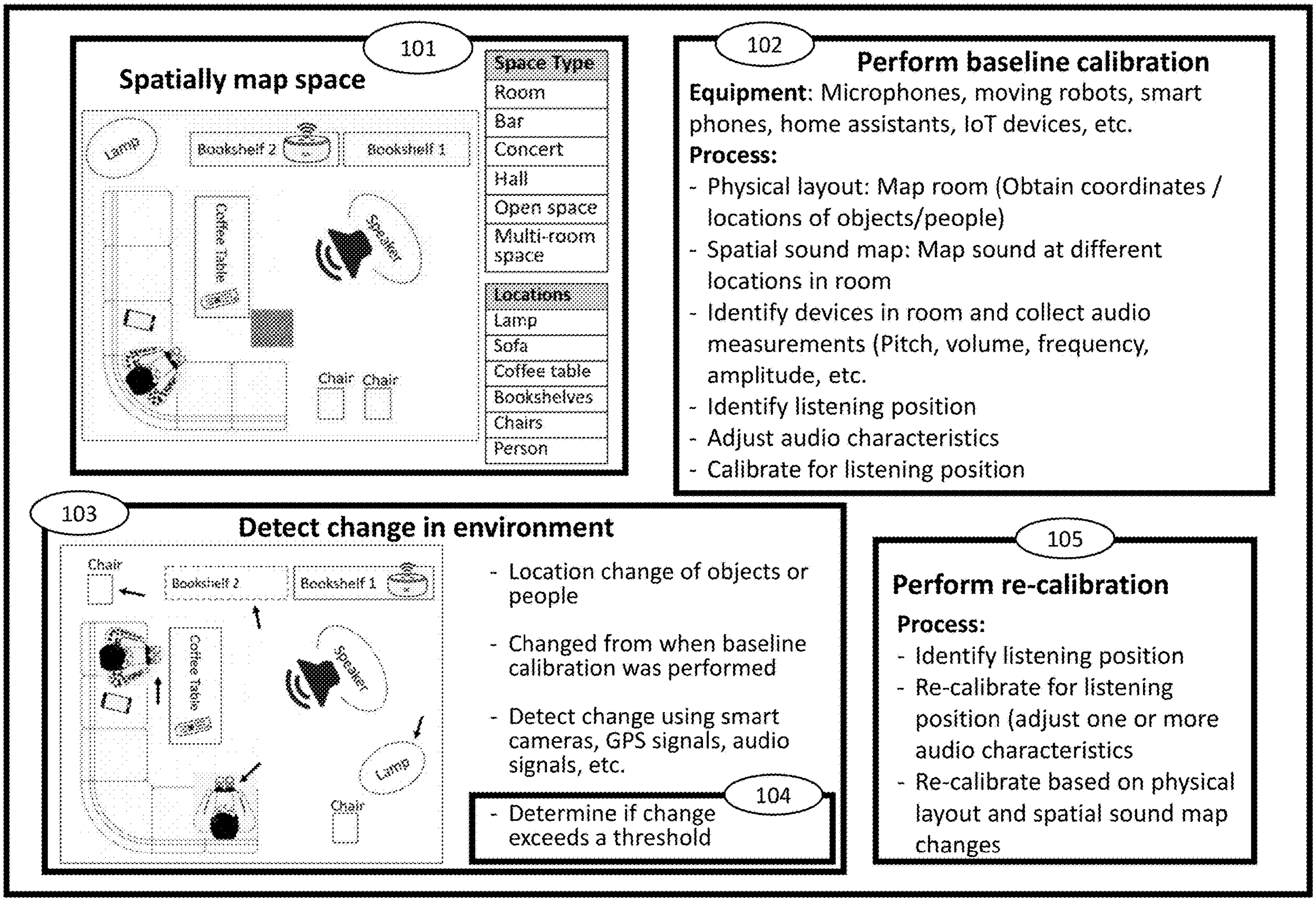
FIG. 1 is a block diagram of a process for auto re-calibrating sound based on detecting a change in the environment surrounding an audio source, in accordance with some embodiments of the disclosure.

In accordance with some embodiments disclosed herein, some of the above-mentioned limitations are overcome by calibrating or automatically re-calibrating sound from an audio source (which may include one or more distinct audio sources, e.g., speakers) for a relatively confined environment, such as a living room, local bar, hall, etc., or a more open environment, such as a concert venue, stadium, amphitheater, etc.

In some embodiments, sound from an audio source may be automatically recalibrated for an environment. To do so, systems and methods used may utilize various types of equipment and hardware to physically map a space and/or audibly map the space surrounding the audio source. Accordingly, in one embodiment, a sound map, also referred to herein as a spatial sound map, may be generated, determined, or accessed if one already exists. The spatial sound map may be a mapping of sound at different locations within a confined space, which may also be referred to as spatial sound data. For example, it may be a measurement of sound characteristics of a tone emitted by an audio source at the different locations within the confined space. Such measurements, in some embodiments, may be measured by robotic assistants, microphones, and/or any other device that includes a microphone and is capable of receiving the emitted tone as an input (e.g., smartphone, home assistant, remote control, smart thermostat, baby monitor, etc.) The spatial sound map generated may be based on the measurements obtained from all such devices and may indicate how the tone may sound at the different locations in the confined space, e.g., it may indicate the volume or frequency of the tone at a bookshelf placed in a first corner of the room, which includes a home assistant device placed on one of its shelves that was used to measure sound characteristics of the tone.

In another embodiment, a physical layout of a space or environment, also referred to as spatial map, map, physical layout of a space or environment, or physical layout, may also be generated (or accessed if one already exists). The physical layout may be a different map than the spatial sound map or it may be combined with the spatial sound map. The physical layout may be associated with locations, dimensions, materials, and entities (e.g., objects, animals, people) in the space. Mapping included in the physical layout may include identification of the objects, people, animals, and potentially any other physical elements in the space, which may be relatively confined, such as a living room. Such mapping may also include mapping all the audio sources in the space, including the audio sources for which calibration is to be performed. The mapping may also include other audio sources in the vicinity that generate background noise, such as a washing machine, dog barking, music playing in another room, outdoor noise that can be heard in the space, such as construction sounds from a neighboring building etc. Since all such physical and acoustical elements may affect the sound propagated from audio source(s) (e.g., speakers), their mapping may be relevant to calibrating the sound propagated from the source to produce the desired or most optimal sound experience for the listener.

In some embodiments, there may be physical entities (e.g., objects, people, animals) that occupy physical space in the confined space as well as generate sound. For example, a microwave, washing machine, people talking in the room occupy both physical space and generate sound. As such, the physical aspect of the entities may be included in the physical layout while the sound produced by the entities may be included in the spatial sound map. Using the example above, if a washing machine is running a 30-minute wash cycle and is located in a second corner of the room, then the spatial sound map me indicate the source of the sound generated by the washing machine, the duration of the sound (as devices may interact with each other to determine the time of the wash cycle) and also the effect of the washing machine sound as well as the tone generated by the audio source at different locations of the room. As such, the sound of the tone generated by the audio source and the sound of the washing machine may be measured at the bookshelf placed in the first corner of the room, which includes the home assistant device placed on one of its shelves as described earlier. The sounds of the tone and the washing machine may be analyzed together and their combined effect on the sound characteristics of the tone generated at the bookshelf may be indicated in the spatial sound map.

In some embodiments, the physical layout created may include details relating to the objects, people, animals, and audio sources within the spatially mapped space. For example, it may include the size and dimensions of the objects, coordinates and locations of people and animals, coordinates, and locations of audio sources in the room, sound levels of each audio source, including background noises, etc. In some embodiments, the physical layout may have been already generated and may need an update.

Whether the physical layout is pre-generated or is newly generated, once the physical layout exists, it may be accessed and used to perform a baseline calibration. In some embodiments, since the calibration may be focused for a specific person consuming the sound, such as an interested individual sitting on a sofa in the living room where the audio source is located, a listening position may also be determined or specified. The listening position may be the location of where the interested person is sitting in their living room.

Once determined, the listening position, as well as sound characteristics or the sound propagated from the audio source at different locations in the room, may be identified on a spatial sound map. The locations of the listening position and the audio source may be identified on the physical layout. Although a spatial sound map has been described in the context of a relatively confined space, the concepts may also apply to an open setting for generating the spatial sound map. For example, in an outdoor setting, such as a concert, sound characteristics of the audio source, also may be referred to as sound source, as measured by different devices, such as smartphones in the audience, may be used to generate a spatial sound map.

Performing the baseline calibration may include an A/V receiver or other computing device transmitting a plurality of tones for each of the audio sources that are to be calibrated. Sound characteristics of the tone may be measured by equipment, such as a microphone, robotic assistant, smartphone, home assistant, and/or distributed microphones in various locations of the spatially mapped room and/or spatially sound mapped room. The measurements may be received back at the A/V receiver and used to calibrate sound to the listening position.

Once the baseline calibration has been performed, details relating to the baseline calibration, such as sound characteristics which may include volume, frequency, pitch, speed, propagation delay, etc., may be stored along with the location and coordinates of objects, people, animals, and audio sources in the room. These stored metrics or data may serve as a baseline to which subsequent comparisons may be made to determine whether a recalibration is needed, and how to perform the recalibration.

The physical layout and/or spatially sound mapped space may be continuously monitored using monitoring equipment, such as smart cameras, robotic assistants, etc. Changes in the environment may be detected and evaluated to determine whether these changes exceed a threshold, which may then trigger a recalibration or other change to sound characteristics or settings. These changes may include changes in location of furniture, animals, people, or the listening position of a user. Since every change in location may not be a significant change, for example, a minor change in location of a chair, such as by a few inches, or a change in orientation of a user sitting in the same place, such as the user rotating 5 degrees, although every change may affect the calibration, the effect may not be significant enough to perform a recalibration. As such, a predetermined threshold may be specified and used to evaluate the changes in the environment to further determine whether the changes are significant enough, in other words, if the change exceeds the predetermined threshold. For example, in one embodiment, the user or system may generate or define a rule where a relocation of an object within the physical layout by more than one foot is to be considered as exceeding the predetermined threshold. As such, based on monitoring the environment, a determination may be made whether any of the objects, people, or animals have moved more than one foot from their original location when a baseline calibration was performed. If so, then the system may determine that the change exceeds a predetermined threshold for which recalibration may be performed.

In some embodiments, recalibration may be performed using the same or similar techniques as those used for performing the baseline calibration. The recalibration may be performed automatically and without user intervention. In some embodiments, the systems may continuously monitor the physical space and the sound characteristics in the space in real time. Any time the environment has changed, such that the changes exceed the predetermined threshold, the system may automatically recalibrate the sound propagated from the audio source for the listening position. In some embodiments, since the room may be mapped based on sound, as described earlier in a spatial sound map, the measurement of a tone at different locations of the room may already be known from the spatial sound map. As such, when recalibration is done for a new listening position, if the listening position is at a different location than the listening position at the time of baseline calibration, and the measurements of the tone for the new listening position are already indicated on the spatial sound map, then the system may use such spatial sound map data during recalibration to adjust the sound to the new listening position. In some embodiments, to provide a continued enhanced listening experience, the systems may continuously monitor for changes that exceed the threshold and automatically recalibrate the audio source when such changes are detected. Once the sound has been recalibrated, the measurement of the recalibrated sound at different locations of the room may be included in a revised spatial sound map.

In some embodiments, the audio source may be located in a larger open or outdoor environment, such as a concert hall, a stadium, a park, or any similar other outdoor setting where the space is not confined with walls and the environment includes a plurality of devices. For example, one such outdoor setting may be a concert being performed by a plurality of musicians at a large venue where a crowd is listening to their music. In another example, the devices may be smart phones, tablets, headsets, devices on which shared music platforms such as Spotify and Apple Music can be downloaded and listed to, and any other type of listening device. In this embodiment, the methods and systems may identify the locations of the plurality of devices. During a soundcheck phase, which may be the initial phase of a band tuning their musical instruments and getting ready to start their performance, a mixing board may request the plurality of devices to measure the sound characteristics of the sound propagated from the audio source. For example, a particular speaker at the concert venue may play music and the mixing board may request the plurality of user devices to capture the sound from the music, measure its characteristics, and report it back to the mixing board. Accordingly, the mixing board may receive feedback associated with a particular sound characteristic from the plurality of devices that have captured and measured the sound propagated from the audio source. The mixing board may then evaluate the measured characteristics and recalibrate to adjust the particular sound characteristic based on their received feedback. The mixing board referred to herein may be of a variety of types. For example, it may be an analog or digital mixing board. It may be a hybrid of analog and digital mixing boards. It may be a virtual mixing board, such as a software program on a computer. Since location of the plurality of devices may be determined, the recalibration may be focused to a listening position that is central to the plurality of devices.

In some embodiments, feedback may be received for a particular sound characteristic, such as the volume, or such as audio related to a particular instrument. If feedback for a particular sound characteristic is received in the feedback, such as for volume, the system may compute an average, mean, or standard deviation of all the feedbacks relating to volume to determine a value that should be used for recalibrating that volume.

In some embodiments, if the feedback includes details as to a particular instrument, such as a guitar not being heard properly, then such feedback may be transmitted to the mixing board and/or to the musicians such that they can make the appropriate adjustments.

Turning now to figures, FIG. 1 is a block diagram of a process for auto re-calibrating sound based on detecting a change in the environment surrounding an audio source, in accordance with some embodiments of the disclosure. The process 100 may be implemented, in whole or in part, by systems or devices such as those shown in FIGS. 2 and 3. One or more actions of the process 100 may be incorporated into or combined with one or more actions of any other process or embodiments described herein. The process 100 may be saved to a memory or storage (e.g., any one of those depicted in FIGS. 2 and 3) as one or more instructions or routines that may be executed by a corresponding device or system to implement the process 100.

In some embodiments, at block 101, a step in creating an optimal audio experience may involve mapping the space for its physical layout and sound characteristics to understand the locations of objects, people, audio sources, and sound characteristics.

Mapping a space and generating a physical layout based on the mapping may provide invaluable insights into the acoustic characteristics and optimize sound distribution accordingly. This physical layout can represent a room, a public venue, or a larger outdoor area.

In some embodiments, an existing physical layout or map of the environment may be used and in other embodiments, a physical layout may need to be generated. If a physical layout of the space exists, it can be used for performing a baseline calibration. In some embodiments, an existing physical layout may be updated, improved, or used as a foundation for generating a physical layout. This physical layout might be provided, such as by a home automation system, a robotic assistant, or a SLAM-capable device. The physical layout may include information relating to the objects, people, animals, etc. present in the space and their coordinates within the space. For example, the physical layout may include coordinates, locations, positions, orientations, and/or size and shape of objects, such as a lamp, sofa, coffee table, bookshelves, chairs, and the single individual person depicted in block 101, and their spatial relationship anchored to the audio source or another point within the space.

When a physical layout is not previously generated, or not available for use, various methods can be employed to generate the physical layout. In one embodiment, a robotic assistant may be used to autonomously navigate the space, e.g., travel from one corner to another within the space (analogous to robot vacuum cleaners) detecting and mapping the locations of objects and people. The robotic assistant, in some embodiments, can use its smart cameras and sensors to identify dimensions, coordinates, and even interact with users through natural language to determine their locations. For example, the robotic assistant may ask a question to the person it senses is in the room. The question may be, for example, "how are you doing," and when the person responds, based on the direction and location of the speech from the person, the robotic assistant may identify the coordinates and approximate position where the person is located within the space.

In another embodiment, smart cameras, such as IoT cameras, that are located in the space may be used to capture videos and images within a short period of time, such as within 10-seconds, or 10-minutes. These videos and images can then be analyzed using artificial intelligence and/or machine learning methods, including techniques utilizing computer vision, to identify locations of people, animals, and objects and generate a physical layout. For example, objects such as lamp, sofa, coffee table, bookshelves, chairs, and the single individual person in their room may be identified in the physical layout. Such mapping method and generating of the physical layout is particularly useful in crowded or dynamic environments where robotic navigation might be challenging due to the inability of the robot to freely roam about the space.

In yet another embodiment, data relating to locations of people, animals, and objects within the space may be obtained by using sound propagation analysis. Using sound propagation, the control circuitry 220 and/or 228, by analyzing how sound waves propagate and reflect within a space, may determine the locations of objects, people, and animals. This method is based on the principle that sound waves interact differently with various materials and surfaces. Using this embodiment, sound waves emitted by a person speaking may be captured as they travel through the airspace, interacting with objects and surfaces. As the words spoken by the person, and the associated sound waves, encounter objects, they may undergo reflections and refractions. Various techniques may be used to measure the sound waves, including sound characteristics such as speed of sound and time of flight to then determine an approximate distance between the person speaking and the robotic assistant, or another device capturing the sound. Based on such distance approximations, the location of the person within the space may be identified. Various types of sound propagation equipment, such as robotic assistants, distributed microphones, and any other type of devices that include a microphone, may be used to receive the sound propagated from the audio source and measure it.

Regardless of the mapping method chosen, the collected data is processed to create a physical layout and/or a spatial sound map. This map contains metadata about audio sources, people, and objects, including their locations, coordinates, and dimensions. The physical layout can be generated by the home automation system, a robotic assistant, or a cloud-based service. It may also be generated by a central control unit or another type of application. It may also be generated by a third party or a remote server if physical data relating to the space is provided. If the space is a larger space, a drone may also be used to analyze the space using image recognition techniques that are then used for generating a spatial layout. Once the physical layout with the metadata identifying the location, position, coordinates, size and shape, and other attributes of people, animals, and objects in the space has been generated, it may be used to understanding the acoustic characteristics of the space and calibrate sound propagated in the space by accounting for such people, animals, and objects.

In some embodiments, mapping of the room either to create a physical layout or a spatial sound map may include identifying a listening position. The listening position is the location of a person for whom the sound is directed. In other words, the person sitting on a sofa in the room in block 101 would want to have the best sound experience when watching a movie. As such, the person's location and associated coordinates may be relevant to calibrate and focus sound on that specific point where the person is located on the sofa. Such calibration ensure that the person receives the optimal audio signal, and the sound quality is customized to the person's liking (e.g., determined based on the person's profile or listening habits). Any of the embodiments described above, e.g., use of robotic assistants, smart cameras, sound propagation may be used to identify the listening position. In addition, triangulation techniques that use signals received from multiple devices to identify the location of a person may also be used. In the context of a space, such a living room where a television is located, triangulation techniques may be applied by using devices equipped with transmitters and receivers, such as smartphones, smart speakers, home assistants, smart watches, and robotic devices. Using triangulation techniques, the control circuitry 220 and/or 228 may determine the time it takes for a signal to travel from a device to a person and back, and accordingly the distance between the device and the person can be calculated. By using the distances from multiple devices, a triangulation algorithm can be used to determine the person's approximate location within the living room. Once determined, the listening position may be indicated on the physical layout and/or the spatial sound map. Although various embodiments have been described in terms of calibrating sound for a particular listening area, i.e., a position where a person is located to receive the sound, the embodiments are not so limited and other positions and objects may also be the focus of the calibration. For example, locations of a smartphone or where a majority of smartphones are clustered, locations of home assistant devices, particular spaces, such as a sofa where people in the house typically sit to watch TV, a popular section of the bar where most people usually gather or spend most of the time, a particular area in the kitchen, such as near the cooktop or stove where people typically spend most of their time while in kitchen, may also be used as a focus area for sound calibration.

In another embodiment, physical layout of the space may include identifying one or more audio sources within the space. The audio sources may be a stand-alone speaker, a television, a music player, etc. The audio sources, such as speakers may be positioned throughout in various configurations, such as some may be visible, some may be embedded into systems, and some may be embedded into walls, which may be detected by devices and robots equipped with sensors. The audio sources may be around a single listening area or multiple listening areas, such as in different rooms of the house, accommodating individual or group listening. They may control a single listening zone or multiple listening zones independently. In some embodiments, only one audio source may be located in the space and in other embodiments an A/V receiver may be connected to a plurality of speakers. For example, it may operate in a 7.1 mode and be connected to 7 speakers and a subwoofer.

At block 102, once a space is mapped, such as for its sound (e.g., identified in a sound map) and/or locations of entities (e.g., identified in a physical layout), a baseline calibration may be performed. As described earlier, the baseline calibration may be performed for a particular listening position, such as where a person in the room is located. For example, if a person is sitting on a sofa and watching TV, then calibration may be performed to the location of the person such that optimal audio signals are provided to that location. In other embodiments, calibration may be performed for a particular device, such as the person's smartphone, or a specific location within the space.

Performing baseline calibration, in some embodiments, may ensure optimal sound quality from an audio source to a listening position. The process may involve adjusting various audio settings to compensate for space acoustics, speaker placement, objects and people placement in the room, and personal preferences. Various techniques may be used to perform such a baseline calibration.

In some embodiments, baseline calibration may be user-initiated. For example, when the system or audio source is turned on, the user may speak a command, such as "calibrate my speakers," "focus the audio on my seating area," or "calibrate the audio using my user profile."

In a user-initiated calibration, methods and systems may use robotic assistants, distributed microphones or devices, sound propagation methods as described earlier, or other commonly known calibration techniques may be used. For example, in some embodiments, a robotic assistant equipped with audio sensing capabilities can be used to measure the space's acoustics. The robotic assistant, analogous to a robotic vacuum cleaner or an automated mobile pet entertainment system, moves around the space, recording calibration tones generated by the A/V receiver and transmits that data such that it may be included in a spatial sound map. This data is then used to adjust speaker settings. In other embodiments, multiple devices located within the space can measure calibration tones generated by the A/V receiver or the audio source. The data collected from the multiple devices is received back at the A/V receiver and analyzed to determine necessary adjustments. For example, if a tone intended to be at a desired level is measured lower than the desired level, as reported by the devices in the space to the A/V receiver, then the output of the tone may be increased such that at the listening position it measures within a threshold of the desired level. In yet other embodiments, advanced algorithms and distributed microphones can measure the room's acoustics and automatically adjust speaker levels, delays, and audio settings. Real-time analyzers can also be used for frequency and response measurements.

In some embodiments, baseline calibration may be performed in an iterative trial and error manner. Using this iterative process, which may involve multiple adjustments to speaker levels, tone controls, and other settings, the A/V receiver (or other part of the home entertainment system or a central controller) may continue adjusting sound characteristics until the desired sound level is measured at the listening position. In some embodiments, user preferences, which may be stored in user profiles, or user history, may be considered to adjust the baseline calibration.

In a non-user-initiated setting, the baseline calibration may be performed when the space, such as the living room where the audio source is located, is unoccupied. In this embodiment, the system may automatically perform baseline calibration to establish a baseline without interference from people or pets.

Once baseline calibration is completed, the A/V receiver may record adjustments for each speaker channel, including sound pressure level, frequency characteristics, and phase/delay. If a robotic system is used, as described as one of the embodiments to perform the calibration measurements, data obtained from the robotic assistant may be used, such as by the home entertainment system or a central controller, to instruct the A/V receiver to adjust its sound output per audio source, optimizing the reproduction of multi-channel sound input. Additional details relating to performing baseline calibration are described in the description of FIG. 6.

Referring back to block 102, a plurality of devices may be located at different locations in the confined space, such as the living room. For example, as depicted, a smartphone associated with the user may be located on the sofa, a remote control may be located on the coffee table, and a home assistant may be located on bookshelf 2. All these devices may include a microphone that may be able to receive the tone propagated from the audio source as input, measure the sound characteristics of the tone, and report it to a system and/or the AV/receiver. Such tone measurements at the different locations may be used to generate the spatial sound map for the space. Additionally, for locations in the room where a device with a microphone is not available, such as the location of the chairs or the location of the lamp, the measurements of the tone from the devices may be used to triangulate and estimate the measurement of the tone at places where a device for measuring the tone is not available. All such triangulated data may also be included in the spatial sound map. Having such data may allow the system to recalibrate or adjust sound settings at block 105 as needed to different locations in the room. For example, if a listening position were to change to the chair, since tone measurements for the chair location may already be available through the generated spatial sound map, the system would recalibrate sound using such data from the spatial sound map for a listening position that is on the chair. As referred to herein, a change in listening position is related to a change in location of a user that is consuming the audio from the audio source. These changes may illustratively include change in location of the user from one side of a sofa to another, as depicted in blocks 101 and 103, change in location to a different part of the room, change in orientation, such as from a standing position to a sitting down or laying down position, or change in location where the user leaves the space or the room. A change in listening position in reference to a group of people may include changing the focus of the sound from one individual to another, such as when one individual is distracted, leaves the room, or is no longer interested in consuming the audio and the focus is to be directed to a second individual that is located at a different location of the room.

Change in listening position may also include directing the focus of the sound to a different location in the space that where the sound was focused during the baseline calibration.

Change in listening position may be associated with a change in displacement of the user. As referred to herein, displacement may include change in distance, orientation, direction, pose, or position of a user. For example, if a user orients away from the sound source, that may also be considered to be a change in listening position.

At block 103, once a baseline calibration is performed, the control circuitry 220 and/or 228 may monitor the space to detect any changes in the environment. Since environmental changes can impact the acoustic properties of a space and affect the listening experience, such monitoring of changes may be useful in re-calibrating sound to ensure an enhanced listening experience or a listening experience that is consistently maintained, within a reasonable margin, to the original baseline experience. As such, audio systems, such as the home entertainment system, may automatically monitor its environment to detect any environmental changes and adapt to these changes to maintain optimal sound quality at the listening position.

In one embodiment, a change in environment (also referred to as displacement within the physical layout) may be due to movement of objects or furniture within the space. For example, if a sofa is moved to a different location after baseline calibration, the sound reflection and absorption patterns in the living room may change. Similarly, adding or removing furniture may impact the acoustics.

In another embodiment, a change in environment may be due to changes in occupancy in the space where the baseline calibration was performed. As referred to herein, a change in environment is associated with a displacement in the physical layout of any objects, people, animals, and any other physical elements within the physical layout. Such a displacement may also include the user who was consuming the audio from the audio source themselves leaving the room or displacing to another location in the room.

The presence of additional people or animals in the room can introduce new audio sources and alter sound absorption. For instance, if more people enter a room after the baseline calibration, the acoustics of the space may be affected. Additionally, pets can introduce noises that can influence the listening experience. Likewise, if the people or pets were present during the baseline calibration, for which the baseline calibration may have accounted for, and subsequent to the baseline calibration some or all of the people or pets leave the space, that also changes the acoustic dynamics of the space.

In yet another embodiment, a change in environment, e.g., change in the physical layout, may be due to introduction of new audio sources. Background noise from appliances, conversations, or external sources can disrupt the acoustic environment. These changes can alter the overall sound balance and impact the listening experience. Likewise, if the background noise was present during the baseline calibration, for which the baseline calibration may have accounted for, and subsequent to the baseline calibration, the background noise is removed, that also changes the acoustic dynamics of the space.

All or some of these factors described above may change the sound propagation properties and acoustics of the mapped space, leading to a different listening environment compared to the baseline calibration. To maintain optimal sound quality, the system may monitor for any such changes or displacements within the physical layout and automatically adapt accordingly.

In some embodiments, changes in the environment in the mapped space may be detected using any devices capable of monitoring the space visually or audibly. For example, home automation and entertainment systems, smartphones, smart cameras, and other IoT devices can be used for this purpose. In addition, a robotic assistant or a device with computer vision capabilities may also be used to detect changes in the environment in the mapped space.

In some embodiments, home automation systems may continuously monitor noise levels to identify changes in the acoustic environment. If a change in acoustics is detected, e.g., increase or decrease in sound or new sounds, then the system may determine that environmental change has occurred.

In some embodiments, smart camera(s) may be used to detect a change or displacement in the environment, e.g., within the physical layout, in this embodiment, the mapped space may be equipped with one or more smart cameras. These cameras may capture initial snapshots during baseline calibration. The captured images may then be stored. These images may depict positions of objects, such as furniture, and people and animals within the mapped space.

In some embodiments, the smart cameras may be programmed to take periodic images of the space, such as every 10-30 seconds or 1-5 minutes. These intervals can be pre-determined by the control circuitry 220 and/or 228 or based on user input. The images taken periodically, or at set intervals, i.e., images taken subsequent to the baseline calibration, may then be compared to images captured during baseline calibration. The smart cameras, control circuitry 220 and/or 228, home automation systems, cloud services, AI engines or other equipment may be used to analyze and compare the images to determine whether environmental changes around an audio source, such as displacements of people, objects, animals, or any other types of physical objects within the physical layout that exceeds a displacement threshold, have taken place. In other words, to determine if any objects or people or anything physical has moved. Image recognition techniques may also be used to identify differences between the images.

In some embodiments, the field of view of the smart cameras may encompass the entire space or only a portion. Multiple cameras can be used to cover the entire space if necessary and images from multiple cameras may be analyzed to detect if the environment around the audio source has changed.

As referred to earlier, in some embodiments, a robotic assistant may be used to detect whether a change in the environment has occurred. Since the robotic assistant may have both visual and audio sensing capabilities, e.g., based on the robotic assistant having a camera and a microphone included within its housing, the robotic assistant may be able to survey the space by roaming about the space and capture images, videos, and audio at the time of baseline calibration as well as periodically thereafter. Surveying may also be performed with other device that are capable of roaming around the room or flying over a space, such as a drone, to determine the space's shape, dimensions, and objects located in the space. The images, videos, and audio captured after the baseline calibration may then be compared to images, videos, and audio captured at the time of baseline calibration to determine if any environmental changes have taken place.

In yet other embodiments, heat maps may be used to detect whether a change in the environment has occurred. In these embodiments, the space may be equipped with infrared cameras, thermal imaging equipment, and other devices that include capability to perform thermal imaging of the space. In such embodiments, using such equipment, a heat map may be generated for the time of the baseline calibration. Since the human body emits infrared radiation, which is invisible to the naked eye but can be detected by specialized infrared cameras, the generated heat maps may identify people within the space and their locations based on the emitted infrared radiation. In some embodiments, heat map processing software may be used to analyze the captured infrared images at the time of the baseline calibration and create heat maps. It can also be used to identify areas of significant heat variation, which may indicate the presence of a human body. Subsequent to the baseline calibration, a subsequent heat map may be generated and compared to the heat map generated at the time of baseline calibration. If people or animals have moved since the baseline calibration, such movement and the new location of the people or animals may be captured by the heat map. As such, if a change in location of a person or animal (or even a device that emits infrared radiation, such as a smartphone), then a determination may be made that a change in the environment has occurred.

Although a few examples of detecting change in the environment have been described, the embodiments are not so limited. Any other equipment or technique that detects change in the physical, or acoustic environment are also contemplated.

Once a determination is made that a change in the environment has occurred, a determination may be made at block 104, whether the change exceeds a threshold. Since small and insignificant changes may not warrant a change in calibration, since the effect of the change may be minimal, a change that exceeds a predetermined threshold may be the trigger for performing a second calibration. The predetermined threshold may be generated by the user, automatically by the control circuitry 220 and/or 228, or by an Artificial Intelligence (AI) or Machine Learning (ML) engine, such as based on what thresholds may be used by others. For example, the predetermined threshold may be a percentage, such as 5, 10, or 20%. It may also be a change in the number of people, or a number of new objects introduced into the physical layout that has been spatially mapped (or taken away from the space). The threshold may also be a decibel level, e.g. the audio should exceed a certain decibel level or a delta from the baseline decibel level for it to be considered a threshold change. One example of exceeding the predetermined threshold may include a sofa, which is a fairly big object, being moved 5 feet away from its original space during or after the baseline calibration. Using this example, first coordinates of the object, e.g., sofa, may be determined in its first or original location. As described earlier, the first or original location may correspond to a location of the object at the time when the baseline calibration is performed. Then the control circuitry 220 and/or 228 may monitor the space to detect a change in location of the object, e.g., the sofa, from its first/original location to a second location. The monitoring may be based on any of the methods described herein, such as by using smart cameras, sound propagation techniques, robotic assistant, etc. In response to detecting change from the first location to the second location, based on the monitoring, the control circuitry 220 and/or 228 may then obtain coordinates of the object in its second location. The control circuitry 220 and/or 228 may then compare the coordinates of the first location to the coordinates of the second location to determine whether the distance from the first location to a second location exceeds a threshold distance, which may be the predetermined threshold distance. Likewise, the control circuitry 220 and/or 228 may also compare the orientation, pose, direction of the user, which are associated with user displacement, with the new displaced orientation, pose, direction of the user to determine whether the displacement exceeds the threshold, which may be the predetermined threshold displacement. If it does, then a recalibration may be performed.

If a determination is made that the change in environment exceeds the predetermined threshold, then at block 105, in one embodiment, the control circuitry 220 and/or 228 may initiate an automatic recalibration process. This recalibration may be performed to maintain optimal sound quality by adjusting the audio output to match the new and changed environment, e.g., due to movement of furniture, addition of people, movement of a person, addition of sounds, etc. The recalibration may be performed in the same manner as the baseline calibration but performed automatically and without any user intervention.

To perform the recalibration based on the changed environment, various methods described above for baseline calibration may be used. For example, in some embodiments, the control circuitry 220 and/or 228 may use a variety of listening devices, including robotic assistants or distributed microphones, to assess the sound characteristics of the changed environment. If a robotic assistant is used, the robot assistant may change its orientation while capturing the tones such that it is able to capture more properties of the soundscape if it is fitted with a limited number of microphones. These listening or sensory devices may strategically be positioned throughout the physical layout area to capture accurate sound data.

In some embodiments, the process of recalibration may include the A/V receiver generating multiple tones simultaneously, targeting different audio sources in the physical layout. For example, the A/V receiver may generate a 200 Hz tone for speaker 1, a 300 Hz tone for speaker 2, etc. The tones can be played sequentially or all at the same time by the A/V receiver. On the receiving end, a simple rejection filter may be used to isolate the sound signature sent to each speaker. Getting the tones simultaneously may allow for efficient calibration of all audio sources, such as speakers, at once. The listening devices may then measure and record these tones, providing information about the system's performance in the changed environment.

In some embodiments, data related to the tones, such as its measurement values, is analyzed by the system's server or control circuitry 220 and/or 228. By comparing the current tone measurements to those from the baseline calibration, the system may identify the certain adjustments to ensure optimal sound reproduction. These adjustments may involve modifying various audio parameters, such as volume, equalization, speaker balance, or delays. In other embodiments, data related to the tones, such as its measurement values, may be measured by devices in the physical layout, such as smartphones, home assistants, robotic equipment, the consumer's own smartphone located at the listening position etc. The devices may then report the measured data relating to the tones to the system's server or control circuitry 220 and/or 228. The system's server or control circuitry 220 and/or 228 may have a predetermined measurement, or an anticipated measurement, for the listening position. For example, the volume at the listening position may be anticipated to be at volume level 12 to get the best effect for the music that the user at that listening position is consuming.

However, if the measurement by a device at or within proximity of the listening position is reporting a volume level of 9, then recalibration may be automatically done such that the volume at the listening position is raised to the anticipated volume measurement, e.g., volume level 12. Some retesting of measurements may be performed until the measured data matches the anticipated data. In this example, the system's server or control circuitry 220 and/or 228 may continuously compare the measured data with anticipated data and continue to recalibrate to keep the volume level at 12.

The recalibration process may be fully automated and designed to be performed in real-time, minimizing any disruption to the user's listening experience. By dynamically adapting to environmental changes, the system may deliver quality audio, or audio preferred by the user in their user profile, regardless of the dynamically changing environment.

Referring back to block 105, if a determination is made that the change in displacement of the user or physical objects in the physical layout exceeds the predetermined displacement threshold, then in another embodiment, the control circuitry 220 and/or 228 may transmit the audio to the user's device, such as a smartphone, instead of performing a recalibration. This embodiment may also be used when the user has left the room.

In the event the user, such as the user in block 101, has moved from their listening position, then the recalibration may also account for the new listening position in determining which parameters of sound to adjust such that at the new listening position, the sound similar to the original sound at baseline calibration is delivered to the user. Additional details relating to recalibration and various processes used are described in relation to the description of FIGS. 6 and 8.

In some embodiments, automatic recalibration may be performed if a) a change in location of entities (e.g., objects, people, animals, audio source) in the environment that exceeds a threshold has occurred, b) a change in location of the listening position that exceeds a threshold has occurred, and c) a combination of both a) and c) has occurred. To perform the automatic recalibration, the system may use only the physical layout, only the spatial sound map, listening position, or a combination of all three. For example, if no changes have been made to the environment except for the listening position, e.g., the only user in the room consuming the studio from the audio source has moved to a new location in the room, since sound characteristics for the new location may have already been determined during the baseline calibration and recorded in the spatial sound map, the system may use the sound characteristics data of new location previously recorded in the spatial sound map and use such data to perform the recalibration.

Figure 2:
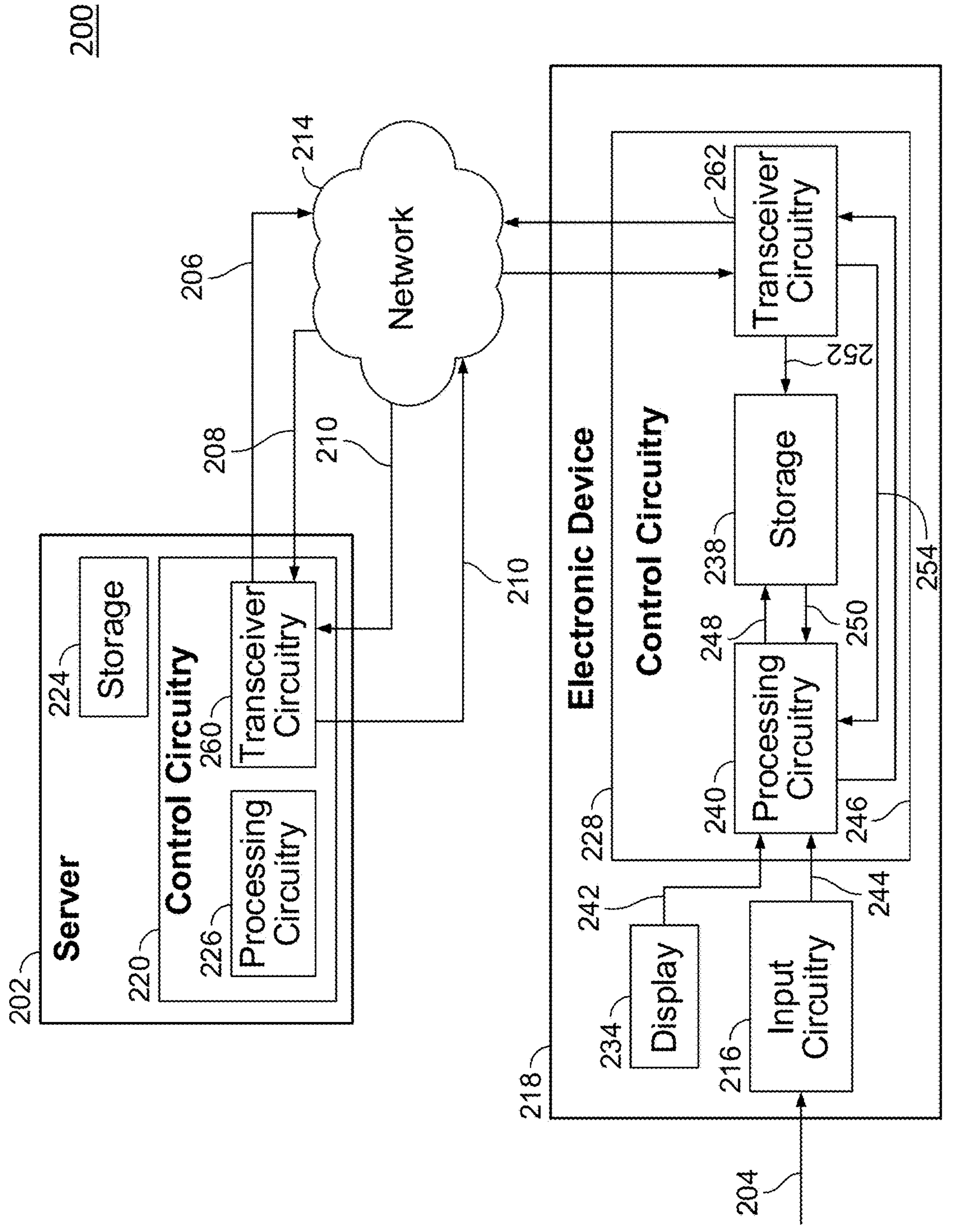
FIG. 2 is a block diagram of a system for auto re-calibrating sound based on detecting a change in the environment surrounding an audio source, in accordance with some embodiments of the disclosure.
Figure 3:
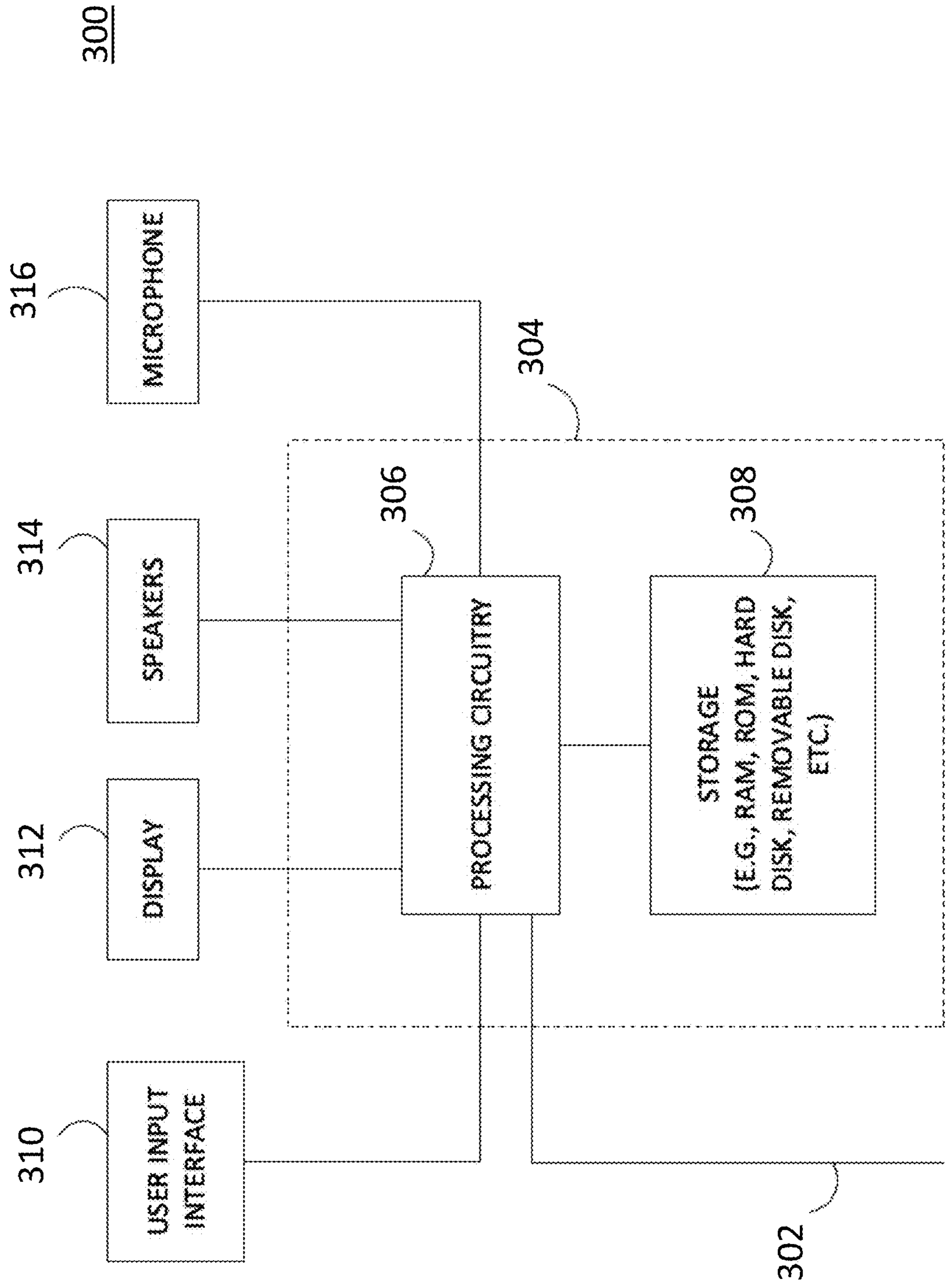
FIG. 3 is a block diagram of a user device used for auto re-calibrating sound based on detecting a change in the environment surrounding an audio source, in accordance with some embodiments of the disclosure.

FIG. 2 is a block diagram of a system for auto re-calibrating sound based on detecting a change in the environment surrounding an audio source, in accordance with some embodiments of the disclosure and FIG. 3 is a block diagram of a user device used for auto re-calibrating sound based on detecting a change in the environment surrounding an audio source, in accordance with some embodiments of the disclosure. FIGS. 2 and 3 also describe example devices, systems, servers, and related hardware that may be used to implement processes, execute user interface operations, and all other steps, functions and functionalities described at least in relation to FIG. 1, and 4-15. Further, FIGS. 2 and 3 may also be used for auto-recalibrating sound from one or more audio sources for a confined or an open outdoor environment, utilizing various type of equipment and hardware to generate a physical layout of a space surrounding the audio source, the process of generating the physical layout including identifying the objects, people, animals, and potentially any other physical elements in the space, mapping all the audio sources in the space, generating the physical layout with size, dimensions of the objects and/or coordinates and locations of people and animals, coordinates and locations of audio sources in the space, accessing a physical layout if already available, identifying listening position in the physical layout and/or the spatially sound mapped space, using the listening position, the spatial sound map and/or the physical layout, or any combination thereof, to perform a baseline calibration of the one or more audio sources for the identified listening position, performing the baseline calibration and recalibration by transmitting a plurality of tones for each of the audio sources, using equipment, such as a robotic assistant, smartphone, home assistant, distributed microphones in various locations of the spatially mapped room to measure the outputted tones, and calibrating based on the measured tones, monitored the spatially mapped room automatically using monitoring equipment, such as smart cameras, robotic assistants, automatically detecting changes in the environment of the spatially mapped room, where changes include changes in location of furniture, animals or people, or audio sources, determining whether the changes are significant enough, e.g., whether they exceed the predetermined threshold, and in response to determining the change exceeds a predetermined threshold, automatically and without user intervention, recalibrating the sound propagated from the audio source. FIGS. 2 and 3 may also be used in a setting where the audio source is located in an outdoor environment, such as a concert hall, a stadium, a park, or any similar other outdoor setting where the space is not confined with walls and the environment includes a plurality of devices, then, during a soundcheck or initial phase, identifying locations of plurality of devices in the crowd, requesting the plurality of devices to measure the sound characteristics of the sound propagated from the audio source, receiving feedback associated with a particular sound characteristic from the plurality of devices that have captured and measured the sound propagated from the audio source, and based on the feedback, performing a recalibration focused to a listening position that is central to the plurality of devices and/or transmitting a notification to the performers in the outdoor venue of the feedback such that they can make the appropriate sound adjustments, and performing functions related to all other processes and features described herein.

In some embodiments, one or more parts of, or the entirety of system 200, may be configured as a system implementing various features, processes, functionalities and components of FIG. 1, and 4-15. Although FIG. 2 shows a certain number of components, in various examples, system 200 may include fewer than the illustrated number of components and/or multiples of one or more of the illustrated number of components.

System 200 is shown to include a computing device 218, a server 202 and a communication network 214. It is understood that while a single instance of a component may be shown and described relative to FIG. 2, additional instances of the component may be employed. For example, server 202 may include, or may be incorporated in, more than one server. Similarly, communication network 214 may include, or may be incorporated in, more than one communication network. Server 202 is shown communicatively coupled to computing device 218 through communication network 214. While not shown in FIG. 2, server 202 may be directly communicatively coupled to computing device 218, for example, in a system absent or bypassing communication network 214.

Communication network 214 may comprise one or more network systems, such as, without limitation, an internet, LAN, WIFI or other network systems suitable for audio processing applications. In some embodiments, system 200 excludes server 202, and functionality that would otherwise be implemented by server 202 is instead implemented by other components of system 200, such as one or more components of communication network 214. In still other embodiments, server 202 works in conjunction with one or more components of communication network 214 to implement certain functionality described herein in a distributed or cooperative manner. Similarly, in some embodiments, system 200 excludes computing device 218, and functionality that would otherwise be implemented by computing device 218 is instead implemented by other components of system 200, such as one or more components of communication network 214 or server 202 or a combination. In still other embodiments, computing device 218 works in conjunction with one or more components of communication network 214 or server 202 to implement certain functionality described herein in a distributed or cooperative manner.

Computing device 218 includes control circuitry 228, display 234 and input circuitry 216. Control circuitry 228 in turn includes transceiver circuitry 262, storage 238 and processing circuitry 240. In some embodiments, computing device 218 or control circuitry 228 may be configured as electronic device 300 of FIG. 3.

Server 202 includes control circuitry 220 and storage 224. Each of storages 224 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 224, 238 may be used to store various types of content (e.g., baseline configurations, reconfigurations, locations and coordinates of objects, people animals, and audio sourced both during the baseline calibration and subsequently after, locations of listening positions, change thresholds, feedback received from plurality of devices in an outdoor environment historical calibrations and adjustments to sound at a same venue, and, AI and ML algorithms). Non-volatile memory may also be used (e.g., to launch a boot-up routine, launch an app, render an app, and other instructions). Cloud-based storage may be used to supplement storages 224, 238 or instead of storages 224, 238. In some embodiments, data relating to baseline configurations, reconfigurations, locations and coordinates of objects, people animals, and audio sourced both during the baseline calibration and subsequently after, locations of listening positions, change thresholds, feedback received from plurality of devices in an outdoor environment historical calibrations and adjustments to sound at a same venue, and, AI and ML algorithms, and data relating to all other processes and features described herein, may be recorded and stored in one or more of storages 212, 238.

In some embodiments, control circuitry 220 and/or 228 executes instructions for an application stored in memory (e.g., storage 224 and/or storage 238). Specifically, control circuitry 220 and/or 228 may be instructed by the application to perform the functions discussed herein. In some implementations, any action performed by control circuitry 220 and/or 228 may be based on instructions received from the application. For example, the application may be implemented as software or a set of executable instructions that may be stored in storage 224 and/or 238 and executed by control circuitry 220 and/or 228. In some embodiments, the application may be a client/server application where only a client application resides on computing device 218, and a server application resides on server 202.

The application may be implemented using any suitable architecture. For example, it may be a stand-alone application wholly implemented on computing device 218. In such an approach, instructions for the application are stored locally (e.g., in storage 238), and data for use by the application is downloaded on a periodic basis (e.g., from an out-of-band feed, from an internet resource, or using another suitable approach). Control circuitry 228 may retrieve instructions for the application from storage 238 and process the instructions to perform the functionality described herein. Based on the processed instructions, control circuitry 228 may determine a type of action to perform in response to input received from input circuitry 216 or from communication network 214. For example, in response to detecting that a change in the environment in the spatially mapped space exceeds a threshold, the control circuitry may automatically, and without user intervention, start a recalibration process to recalibrate the one or more audio sources to the listening position. The control circuitry 228 may also perform steps of processes described in FIG. 1, and 4-15, including determining whether the change is environment exceeds the threshold or in an outdoor environment whether to perform recalibration based on feedback received from the plurality of devices in the crowd.

In client/server-based embodiments, control circuitry 228 may include communication circuitry suitable for communicating with an application server (e.g., server 202) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 214). In another example of a client/server-based application, control circuitry 228 runs a web browser that interprets web pages provided by a remote server (e.g., server 202). For example, the remote server may store the instructions for the application in a storage device. The remote server may process the stored instructions using circuitry (e.g., control circuitry 228) and/or generate displays. Computing device 218 may receive the displays generated by the remote server and may display the content of the displays locally via display 234. This way, the processing of the instructions is performed remotely (e.g., by server 202) while the resulting displays, such as the display windows described elsewhere herein, are provided locally on computing device 218. Computing device 218 may receive inputs from the user via input circuitry 216 and transmit those inputs to the remote server for processing and generating the corresponding displays. Alternatively, computing device 218 may receive inputs from the user via input circuitry 216 and process and display the received inputs locally, by control circuitry 228 and display 234, respectively.

Server 202 and computing device 218 may transmit and receive content and data such as data relating to baseline configurations, reconfigurations, locations and coordinates of objects, people animals, and audio sourced both during the baseline calibration and subsequently after, locations of listening positions, change thresholds, feedback received from plurality of devices in an outdoor environment historical calibrations and adjustments to sound at a same venue, and AI and ML algorithms. Control circuitry 220, 228 may send and receive commands, requests, and other suitable data through communication network 214 using transceiver circuitry 260, 262, respectively. Control circuitry 220, 228 may communicate directly with each other using transceiver circuits 260, 262, respectively, avoiding communication network 214.

It is understood that computing device 218 is not limited to the embodiments and methods shown and described herein. In nonlimiting examples, computing device 218 may be an electronic device, a personal computer (PC), a laptop computer, a tablet computer, a WebTV box, a personal computer television (PC/TV), a PC media server, a PC media center, a handheld computer, a mobile telephone, or a smartphone, smart camera, robotic assistant, A/V receiver, or any other device, computing equipment, or wireless device, and/or combination of the same capable of suitably performing calibrations and recalibrations, generating physical layouts, detecting changes in the environment, and receiving and measuring sound tones. Control circuitry 220 and/or 218 may be based on any suitable processing circuitry such as processing circuitry 226 and/or 240, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 220 and/or control circuitry 218 is configured for auto-recalibrating sound from one or more audio sources for a confined or an open outdoor environment, utilizing various type of equipment and hardware to generate physical layout of a space surrounding the audio source, the process of generating the physical layout including identifying the objects, people, animals, and potentially any other physical elements in the space, mapping all the audio sources in the space, generating the physical layout with size, dimensions of the objects and/or coordinates and locations of people and animals, coordinates and locations of audio sources in the space, accessing a physical layout if already available, identifying listening position in the spatially mapped space, using the listening position, spatial sound map, and/or the physical layout, or a combination thereof, to perform a baseline calibration of the one or more audio sources for the identified listening position, performing the baseline calibration and recalibration by transmitting a plurality of tones for each of the audio sources, using equipment, such as a robotic assistant, smartphone, home assistant, distributed microphones in various locations of the spatially mapped room to measure the outputted tones, and calibrating based on the measured tones, monitored the spatially mapped room automatically using monitoring equipment, such as smart cameras, robotic assistants, automatically detecting changes in the environment of the spatially mapped room, where changes include changes in location of furniture, animals or people, or audio sources, determining whether the changes are significant enough, e.g., whether they exceed the predetermined threshold, and in response to determining the change exceeds a predetermined threshold, automatically and without user intervention, recalibrating the sound propagated from the audio source. The control circuitry 220 and/or control circuitry 218 may also be configured for, in a setting where the audio source is located in an outdoor environment, such as a concert hall, a stadium, a park, or any similar other outdoor setting where the space is not confined with walls and the environment includes a plurality of devices, then, during a soundcheck or initial phase, identifying locations of plurality of devices in the crowd, requesting the plurality of devices to measure the sound characteristics of the sound propagated from the audio source, receiving feedback associated with a particular sound characteristic from the plurality of devices that have captured and measured the sound propagated from the audio source, and based on the feedback, performing a recalibration focused to a listening position that is central to the plurality of devices and/or transmitting a notification to the performers in the outdoor venue of the feedback such that they can make the appropriate sound adjustments, and performing functions related to all other processes and features described herein.

Computing device 218 receives a user input 204 at input circuitry 216. For example, computing device 218 may receive data relating to changes in the environment surrounding the audio source.

Transmission of user input 204 to computing device 218 may be accomplished using a wired connection, such as an audio cable, USB cable, ethernet cable or the like attached to a corresponding input port at a local device, or may be accomplished using a wireless connection, such as Bluetooth, Wi-Fi, WiMAX, GSM, UTMS, CDMA, TDMA, 3G, 4G, 4G LTE, 5G, 5G sidelink (5G NRV2X), 6G, or any other suitable wireless transmission protocol. Input circuitry 216 may comprise a physical input port such as a 3.5 mm audio jack, RCA audio jack, USB port, ethernet port, or any other suitable connection for receiving audio over a wired connection or may comprise a wireless receiver configured to receive data via Bluetooth, Wi-Fi, WiMAX, GSM, UTMS, CDMA, TDMA, 3G, 4G, 4G LTE, or other wireless transmission protocols.

Processing circuitry 240 may receive input 204 from input circuitry 216. Processing circuitry 240 may convert or translate the received user input 204 that may be in the form of voice input into a microphone. In some embodiments, input circuitry 216 performs the translation to digital signals. In some embodiments, processing circuitry 240 (or processing circuitry 226, as the case may be) carries out disclosed processes and methods. For example, processing circuitry 240 or processing circuitry 226 may perform processes as described in FIGS. 1, 4, 6, 8, 10, 13 and 15, respectively.

FIG. 3 is a block diagram of a user device used for auto re-calibrating sound based on detecting a change in the environment surrounding an audio source, in accordance with some embodiments of the disclosure. In an embodiment, the equipment device 300, is the same equipment device 202 of FIG. 2. The equipment device 300 may receive content and data via input/output (I/O) path 302. The I/O path 302 may provide audio content (e.g., such as audio output from an audio source in a spatially mapped space). The control circuitry 304 may be used to send and receive commands, requests, and other suitable data using the I/O path 302. The I/O path 302 may connect the control circuitry 304 (and specifically the processing circuitry 306) to one or more communications paths or links (e.g., via a network interface), any one or more of which may be wired or wireless in nature. Messages and information described herein as being received by the equipment device 300 may be received via such wired or wireless communication paths. I/O functions may be provided by one or more of these communications paths or intermediary nodes but are shown as a single path in FIG. 3 to avoid overcomplicating the drawing.

The control circuitry 304 may be based on any suitable processing circuitry such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 or i9 processor). In client-server-based embodiments, the control circuitry 304 may include communications circuitry suitable auto-recalibrating sound from one or more audio sources for a confined or an open outdoor environment, utilizing various type of equipment and hardware to generate a physical layout of a space surrounding the audio source, the process of generating the physical layout including identifying the objects, people, animals, and potentially any other physical elements in the space, mapping all the audio sources in the space, generating the spatial map with size, dimensions of the objects and/or coordinates and locations of people and animals, coordinates and locations of audio sources in the space, accessing a spatial map and/or spatial sound map if already available, identifying listening position in the spatially mapped space, using the listening position and the spatial map to perform a baseline calibration of the one or more audio sources for the identified listening position, performing the baseline calibration and recalibration by transmitting a plurality of tones for each of the audio sources, using equipment, such as a robotic assistant, smartphone, home assistant, distributed microphones in various locations of the spatially mapped room to measure the outputted tones, and calibrating based on the measured tones, monitored the spatially mapped room automatically using monitoring equipment, such as smart cameras, robotic assistants, automatically detecting changes in the environment of the spatially mapped room, where changes include changes in location of furniture, animals or people, or audio sources, determining whether the changes are significant enough, e.g., whether they exceed the predetermined threshold, and in response to determining the change exceeds a predetermined threshold, automatically and without user intervention, recalibrating the sound propagated from the audio source. The communications circuitry suitable may also be used for, in an outdoor environment, such as a concert hall, a stadium, a park, or any similar other outdoor setting where the space is not confined with walls and the environment includes a plurality of devices, then, during a soundcheck or initial phase, identifying locations of plurality of devices in the crowd, requesting the plurality of devices to measure the sound characteristics of the sound propagated from the audio source, receiving feedback associated with a particular sound characteristic from the plurality of devices that have captured and measured the sound propagated from the audio source, and based on the feedback, performing a recalibration focused to a listening position that is central to the plurality of devices and/or transmitting a notification to the performers in the outdoor venue of the feedback such that they can make the appropriate sound adjustments, and performing functions related to all other processes and features described herein.

The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 308 may be used to store various types of content, (e.g., baseline configurations, reconfigurations, locations and coordinates of objects, people animals, and audio sourced both during the baseline calibration and subsequently after, locations of listening positions, change thresholds, feedback received from plurality of devices in an outdoor environment historical calibrations and adjustments to sound at a same venue, and AI and ML algorithms). Cloud-based storage, described in relation to FIG. 3, may be used to supplement the storage 308 or instead of the storage 308.

The control circuitry 304 may include audio generating circuitry and tuning circuitry, such as one or more analog tuners, audio generation circuitry, filters or any other suitable tuning or audio circuits or combinations of such circuits. The control circuitry 304 may also include scaler circuitry for upconverting and down converting content into the preferred output format of the electronic device 300. The control circuitry 304 may also include digital-to-analog converter circuitry and analog-to-digital converter circuitry for converting between digital and analog signals. The tuning and encoding circuitry may be used by the electronic device 300 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 308 is provided as a separate device from the electronic device 300, the tuning and encoding circuitry (including multiple tuners) may be associated with the storage 308.

The user may utter instructions to the control circuitry 304, which are received by the microphone 316. The microphone 316 may be any microphone (or microphones) capable of detecting human speech. The microphone 316 is connected to the processing circuitry 306 to transmit detected voice commands and other speech thereto for processing. In some embodiments, voice assistants (e.g., Siri, Alexa, Google Home and similar such voice assistants) receive and process the voice commands and other speech, including reporting measurements taken of sound tones propagated by the audio source.

The electronic device 300 may include an interface 310. The interface 310 may be any suitable user interface, such as a remote control, mouse, trackball, keypad, keyboard, touchscreen, touchpad, stylus input, joystick, or other user input interfaces. A display 312 may be provided as a stand-alone device or integrated with other elements of the electronic device 300. For example, the display 312 may be a touchscreen or touch-sensitive display. In such circumstances, the interface 310 may be integrated with or combined with the microphone 316. When the interface 310 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 310 may be HDTV-capable. In some embodiments, the display 312 may be a 3D display. The speaker (or speakers) 314 may be provided as integrated with other elements of electronic device 300 or may be a stand-alone unit. In some embodiments, the display 312 may be outputted through speaker 314.

The equipment device 300 of FIG. 3 can be implemented in system 200 of FIG. 2 as primary equipment device 202, but any other type of user equipment suitable for allowing communications between two separate user devices for performing the functions related to dynamically and automatically performing reconfigurations based on detecting a change in the environment that exceeds a threshold, and implementing machine learning (ML) and artificial intelligence (AI) algorithms, and all the functionalities discussed associated with the figures mentioned in this application.

Figure 4:
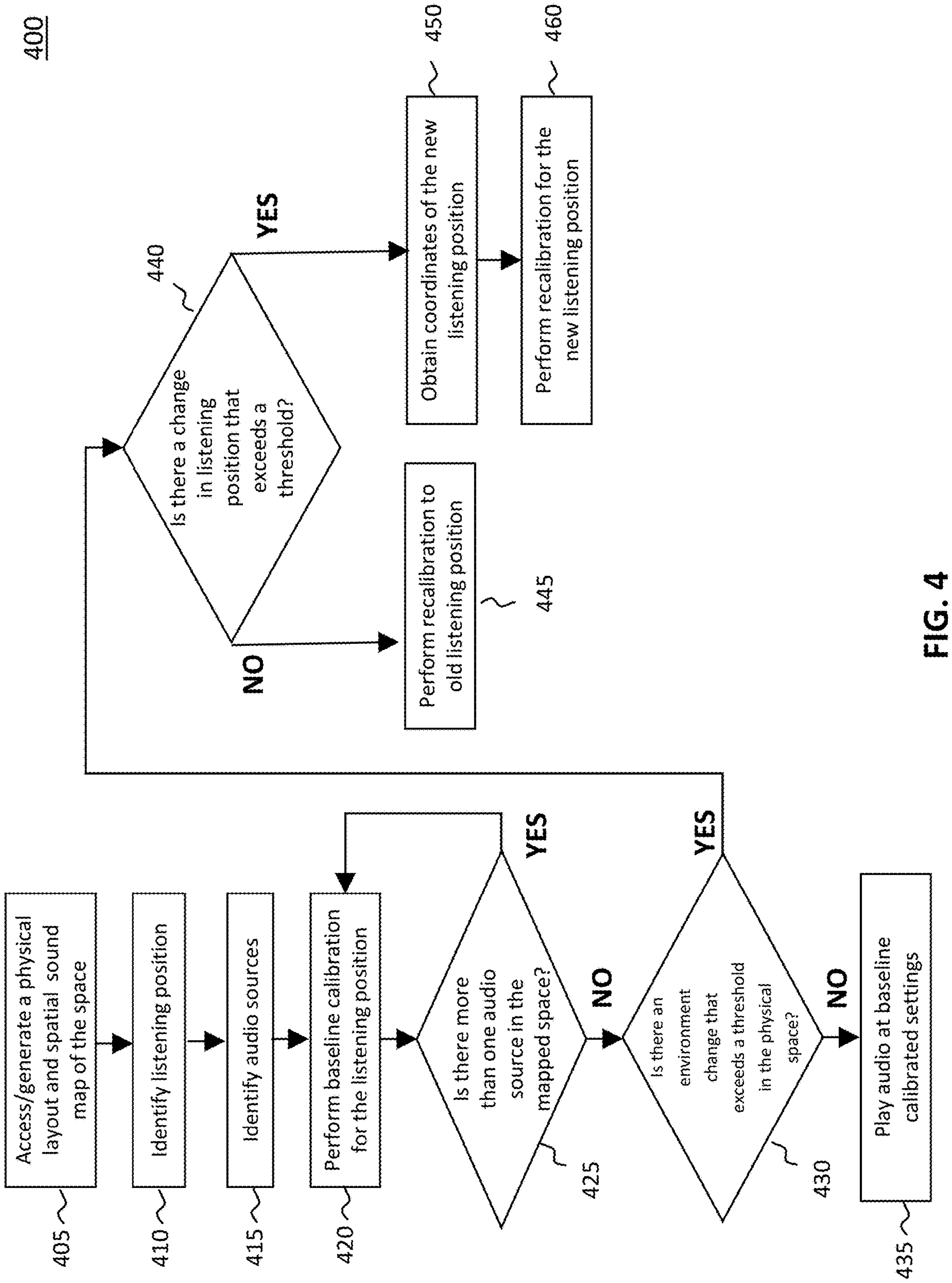
FIG. 4 is a flowchart of a process for auto re-calibrating sound based on detecting a change in the environment surrounding an audio source, in accordance with some embodiments of the disclosure.

FIG. 4 is a flowchart of a process for auto re-calibrating sound based on detecting a change in the environment surrounding an audio source, in accordance with some embodiments of the disclosure. The process 400 may be implemented, in whole or in part, by systems or devices such as those shown in FIGS. 2 and 3. One or more actions of the process 400 may be incorporated into or combined with one or more actions of any other process or embodiments described herein. The process 400 may be saved to a memory or storage (e.g., any one of those depicted in FIGS. 2 and 3) as one or more instructions or routines that may be executed by a corresponding device or system to implement the process 400.

In some embodiments, at block 405, a physical layout and a spatial sound map for a space where the audio source is located may be generated or accessed. If a physical layout already exists, then it may be accessed and used for baseline calibration. This physical layout, may be provided by a home automation system, robotic assistant, or SLAM-capable device, may include information about objects, people, and animals in the space and their corresponding locations and coordinates.

If a physical layout does not exist, then, in some embodiments, at block 405, a physical layout for the space where the audio source and the listening position is located may be auto-created. For example, various devices in the space, such as cameras, robotic equipment, etc., may be used to automatically scan or survey the space, use image recognition and computer vision techniques, to determine the size and dimensions of the room and size, dimension, and locations of objects within the space. The auto-created spatial map may allow the identification of the environment where an audio source is located. Image recognition and computer vision techniques may also be used to identify people and their locations within the space. Data for calibrating the audio source may be determined based on analyzing objects, people, and other audio sources, within the spatially mapped space.

In some embodiments, the generated physical layout may include determining surfaces, shapes of surfaces, material and absorption properties of material, and number of people and devices that are in the spatially mapped room. Since sound waves bounce off surfaces, cause vibrations, sometimes causing resonance, and can bounce back and forth multiple times before dissipating, the data obtained from spatial mapping may provide an understanding of how sound waves may behave and bounce off surfaces within the spatially mapped space. Such spatially mapped data may be used to determine the acoustic characteristics of the spatially mapped sound space which may then be used in calibrating the audio source to factor in such acoustic characteristics.

As described earlier, in some embodiments, at block 405, a spatial sound map may be generated. The spatial sound map may be generated based on measurements of sound as measured at various locations in the space where the audio source is located. For example, it may be a measurement of sound characteristics of a tone emitted by the audio source at the listening position and/or other locations within the confined space. These measurements, in some embodiments, may be measured by robotic assistants, microphones, and/or any other devices that include a microphone and are capable of receiving the emitted tone as an input (e.g., smartphone, home assistant, remote control, smart thermostat, baby monitor, etc.) The spatial sound map generated may be based on the measurements obtained from all such devices and may indicate how the tone may sound at the different locations in the confined space, including at the listening position. The physical layout, spatial sound map, and listening position may all be considered in determining whether to perform a recalibration and if it is to be performed, the sound characteristics to be changed in the calibration and the focus of the calibration to a determined listening position.

Figure 6:
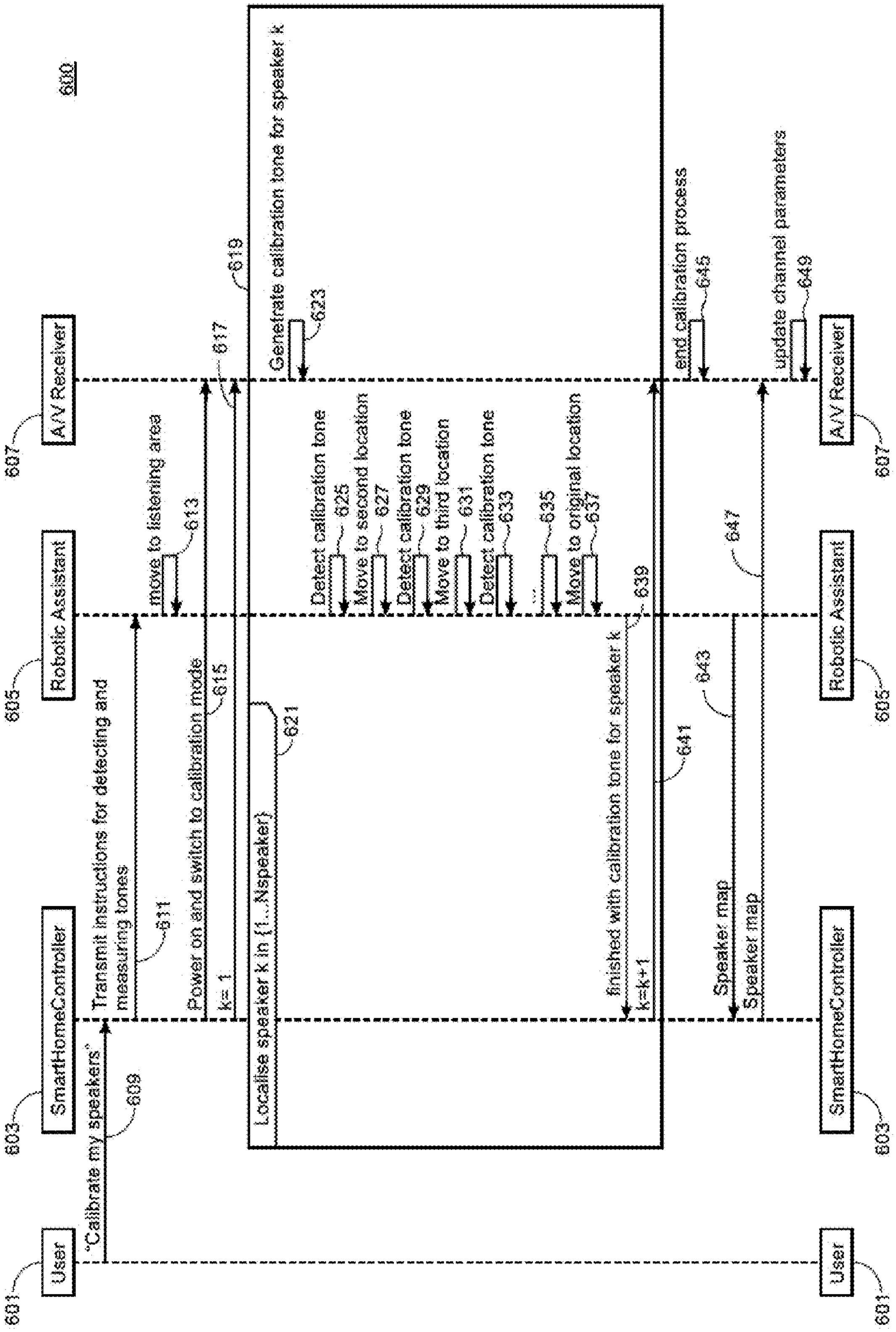
FIG. 6 is a flowchart of a process for performing a calibration using a robotic assistant, in accordance with some embodiments of the disclosure.

The process of spatially mapping the space is described in the description of block 101 in FIG. 1 as well as in the description of FIG. 6.

In some embodiments, a variety of techniques may be used to spatially map a space and generate a physical layout and/or a spatial sound map. In some embodiments, these techniques may include, a) using a robotic assistant, b) using heat maps, c) using distributed microphones, d) using different devices that are currently within the space surrounding the audio source, e) using smart cameras, and f) using sound propagation. Although a few techniques to spatially map the room have been described, the embodiments are not so limited and other conventional techniques for spatially mapping a space are also contemplated.

In some embodiments, the space may be defined as a confined space such as a living room, office, hall, kitchen, or another type of confined space that is surrounded by walls. In another embodiment, the space may be a larger open space that has multiple rooms or multiple open areas, such as a restaurant, bar, lobby of a hotel, etc. In yet our other embodiments, the space may be an open space such as a park, a concert venue area, or a large stadium. When the space is a large area such as the park, concert venue, etc., then a predetermined distance from the audio source may be identified to be the space that is to be spatially or audibly mapped to generate the spatial sound map. For example, only the first 50 or 100 feet from the audio source in an open venue may be identified to be mapped to prevent mapping the entire park or venue area.

With respect to using a robotic assistant for spatially mapping the room and generating a physical layout and/or a spatial sound map, the robotic assistant may autonomously navigate the space, detecting and mapping the locations of objects and people within the space. Since the robotic assistant may include smart cameras, microphones, and sensors, it may be able to identify dimensions, coordinates, and locations of objects, people, and animals within the space. It may also be able to interact with users through natural language to determine their locations. For example, by asking a person a question and analyzing their sound/speech, the robotic assistant may approximate their location within the space. The robotic assistant may also survey the space by roaming around the space by using its sensors. For example, as the robotic assistant comes into contact with an object, such as a sofa in the room, it may use sensors to navigate around the sofa. It may also be able to track its own position through GPS such that it does not repeat navigating an area already navigated. It may also use other types of precise positioning systems for indoor navigation, such as SLAM, Wi-Fi mapping, beaconing, etc. With respect to using a robotic assistant for generating a spatial sound map, the robotic assistant may roam about the room and measure the tones emitted by the sound source. It may then report the measurements and the locations in the room where one or more measurements were taken to the control circuitry, which in turn, may automatically generate a spatial sound map that identifies sound characteristics at the various locations where the robotic assistant measured the emitted tone.

With respect to using heat maps for spatially mapping the room, a heat map may be generated using infrared camera and other equipment and the generated heat maps may be used to detect infrared radiation emitted by objects, devices, people, and animals. Such data may then be used to determine spatially where devices, objects, people, and animals may be located within the space.

With respect to using distributed microphones for spatially mapping the room, using this technique, the control circuitry 220 and/or 228 may utilize a variety of distributed microphones that may be placed in the space to detect sounds. Such distributed microphones may be strategically placed throughout the spatially mapped area to cover the entire space. The distributed microphones may detect speech from a person and based on the proximity of sound to the microphone identify an approximate location of the person. Such data may then be used to spatially map where a person is located within the space. With respect to using a distributed microphones for generating a spatial sound map, the distributed microphones may measure the tones emitted by the sound source. They may then report the measurements to the control circuitry 220 and/or 228, which in turn, may automatically generate a spatial sound map that identifies sound characteristics at the various locations where the distributed microphones measured the emitted tone.

With respect to using different devices, such as smartphones, for spatially mapping the room, the smartphones GPS may be used, and a location of a person associated with the smartphone may be spatially mapped. For example, a person sitting within the space, such as on the sofa of a living room, may be carrying a smartphone. Since the smartphone has GPS capabilities, its location can be reported to the home entertainment system or the control circuitry 220 and/or 228. This allows the control circuitry 220 and/or 228 to map the smartphone within the spatial map. Assuming the user is sitting close to the smartphone, the system may approximate the person's location. In some embodiments, GPS data from the smartphone may be combined with smart camera input that visually detects the person to determine the person's seating position and map their location within the spatially mapped room more accurately. In yet other embodiments, other techniques that use IMU data, SLAM data, wireless data, such as based on wireless sending, may also be used to identify a location of the person, e.g., the listening position. For example, the IMU that may be included in a headgear worn by the user may report its location to control circuitry 220 and/or 228 based on which the user's location may be identified. With respect to using a distributed IMU, SLAM, and other devices for generating a spatial sound map, the IMU, SLAM, and other devices may measure the tones emitted by the sound source. They may then report the measurements to the control circuitry 220 and/or 228, which in turn, may automatically generate a spatial sound map that identifies sound characteristics at the various locations where the IMU, SLAM, and other devices measured the emitted tone. The IMU and other sensor data may be obtained from a device worn by the user to determine the user's location, orientation, pose, and direction.

With respect to using smart cameras for spatially mapping the room, the space may be equipped with one or more smart cameras strategically positioned to cover the entire area. These smart cameras may automatically, without user intervention, capture images of the space. The images captured may then be analyzed using an AI or machine learning model. The analysis may determine the shape, dimensions, materials, and locations of objects, and also determine location of people and animals within the space. This data analyzed may then be used to create a physical layout that identifies the locations and coordinates of objects, people, and animals. Additionally, the smart cameras may have video or audio recording capabilities, using which the smart cameras may record sounds coming from the space. Such sounds may be analyzed to determine the location from which the sound is coming from to then identify the location of a person or animal making the sounds. Image recognition techniques may also be used to identify objects, their shapes, and their materials within the space. All such data may be used to generate a physical layout of the area.

With respect to using sound propagation for spatially mapping the room, it may be used to locate a person by analyzing the time it takes for sound waves to travel from a source to a receiver. Since a sound, such as human speech or animal sound emits sound waves, which travel through the environment and reflect off objects, the characteristics of their sound may be measured by a receiver or other sound measuring equipment in the spatially mapped space. Sound characteristics, such as speed of sound and the time taken for the sound to travel, may be used to approximate the distance between the person or animal making the sound and the receiver. Such data may be used to approximate the location of the person or animal in the spatially mapped space and used to spatially map them. Likewise, sound propagation techniques may also be used for measuring the sound waves at different locations and generating a spatial sound map on its basis.

At block 410, the control circuitry 220 and/or 228 may identify the listening position. The listening position, as used herein, may refer to the location of a person for whom the sound is directed. As such, it is wherever the person is located within the space. For example, the listening position may be on the left side of a sofa, where a person is sitting, closer to the person's ear. If the person is sitting and the person's sitting height is 3 feet off the ground, then the listening position may be on the left side of the sofa, where the person is sitting, and 3 feet off the ground. If the person s standing, sitting, lying down, walking, etc., their head and ear position may be considered in identifying a listening position. If a person is wearing headgear, such as headgear related to a virtual or augmented reality experience, the IMU in the headgear may report the pose as well as whether the person is sitting or standing. If there are two individuals sitting on the sofa next to each other, then the listening position may be a median distance between the two individuals. If the person interested in the media being consumed is an adult who is sitting on the right side of the sofa, and a child that is disinterested in the media being played is sitting on a chair, then the listening position may be near the eardrum of the interested adult. In a larger venue, such as a bar, the listening position may be where a majority of users are clustered together. Accordingly, the listening position may be any location towards which the sound is to be calibrated for providing the best sound experience.

The control circuitry 220 and/or 228 may identify the listening position by using a plurality of techniques. For example, the control circuitry 220 and/or 228 may instruct the robotic device to ask the user a question and based on the voice response from the person, the control circuitry 220 and/or 228 may estimate where the person's mouth is located and then direct the calibration to approximately the person's mouth area since that would provide the best sound to both of the person's ears. In another embodiment, the control circuitry 220 and/or 228 may use a smart camera to capture an image of the person to then determine coordinate and approximate location of their ears. The control circuitry 220 and/or 228 using this data may then calibrate to the location of the person's ears, which may be used as the listening position.

At block 415, control circuitry 220 and/or 228 may identify the audio sources in the space. The audio sources may be a stand-alone speaker, a television, a music player, a speaker integrated in a device, such as a set-top box, or a surround sound system with multiple speakers, such as the surround sound system depicted in FIG. 5. In some embodiments, the audio source may be visible and in other embodiments, it may be embedded into systems or walls, which may be detected only by devices. In some embodiments, the audio source may be within the confines of a room where the listening position is located and in other embodiments the audio source may be located in a separate room or across the hallway from where the listening position is located.

The control circuitry 220 and/or 228 then identifies the audio source using some of the same techniques as that used for identifying the listening position. For example, in one embodiment, the control circuitry 220 and/or 228 may use smart cameras to detect where the audio sources are located within the space. In another embodiment, the control circuitry 220 and/or 228 detect the audio source based on the sound emanating from them, such as by using sound sensors or sound propagation techniques. In yet another embodiment, the audio source may self-identify its location.

In some embodiments, once the physical layout and a spatial sound map of the room is generated or accessed, and the listening position and the audio sources are identified, then, at block 420, the control circuitry 220 and/or 228 may perform a baseline calibration for the listening position. In some embodiments, baseline calibration may be initiated by the user. Baseline calibration, as referred to herein may be an initial calibration performed to establish a baseline for the sound in the room. The baseline calibration may set a standard for what the sound should be when delivered to the listening position, e.g., the optimal sound experience at the listening position.

The user may initiate this baseline calibration by speaking a command, such as "calibrate my speakers." In other embodiments, the baseline calibration may be performed when the audio source is first turned on.

The baseline calibration may be performed by using robotic assistants, distributed microphones or devices, or other commonly known calibration techniques. When a robotic assistant is used, the robotic assistant, analogous to a robotic vacuum cleaner, may move about the space using its navigation sensors and record calibration tones generated by the A/V receiver. Data and measurements related to these recorded calibration tones may then be transmitted to the A/V receiver, the server, and/or the control circuitry 220 and/or 228. Upon receiving the data and measurements, as recorded by the robotic assistant, the data may be analyzed to determine whether the tone intended to be received at the listening position is in fact received with the same or similar characteristics as emitted from the audio source. For example, the tone's frequency, volume, speed, and other characteristics may be measured and compared to the same as emitted. Accounting for some percentage of loss in the tone that is typical due to the physics of the sound waves dissipating as the travel the length from the audio source to the listening position, if other characteristics are not as desired, or not as emitted by the audio source, then those characteristics of the sound may be adjusted during the baseline calibration. In some embodiments, baseline calibration may be performed in an iterative trial and error manner to measure the tones and update the sound characteristics until a desired tone is received at the listening position (or wherever the tone is being measured, e.g., at the robotic assistant).

At block 425, a determination may be made whether there is more than one audio source in the mapped space. If a determination is made that there is more than one audio source, then the process of performing baseline calibration of blocks 420 and 425 may be repeated until all the audio sources in the mapped space have been calibrated to the listening position.

If a determination is made that there is only one audio source or that all the audio sources in the mapped space have been calibrated, then the process may proceed to block 430 where a determination may be made whether there is a change in the environment that exceeds a threshold in the mapped space.

As referred to herein, a change in environment may be any physical or acoustic changes in the mapped space. Since environmental changes can impact the acoustic properties of a mapped space and affect the listening experience, determining whether changes in environment have taken place may be relevant and may be used as a trigger to automatically recalibrate the audio sources. A change in environment may be due to movement of objects or furniture within the space, it may be due to changes in occupancy in the mapped space, and it may also be due to introduction or reduction of audio sources that were not in the space during the baseline calibration.

The mapped space may constantly, periodically, or at set intervals be monitored to determine whether there is a change in environment. Audio systems, such as the home entertainment system, smart cameras, robotic assistants, smartphones, smart cameras, and other IoT devices may be some of the equipment used to monitor the mapped space.

Additionally, techniques, such as heap mapping, sound propagation, image detection may also be used to determine changes in the environment. These systems and techniques may be automatically deployed by the control circuitry 220 and/or 228 to continuously watch the mapped space for any changes. Although a few examples of equipment to be used and few types of techniques used for detecting change have been described, the embodiments are not so limited. Any other equipment or technique that detects change in the physical, or acoustic environment are also contemplated.

Once change in the environment is detected, a determination may be made whether the change exceeds a threshold. To determine if recalibration may be beneficial, the system assesses the magnitude of the environmental change. Minor alterations, such as slight shifts in furniture or listening position, such as by a few inches, may not significantly impact the calibration. However, if the change exceeds the predefined or predetermined threshold, then sound may be affected in a larger scale thereby such changes may warrant and trigger an automatic recalibration. Recalibrating only when triggered for a change that exceeds the predetermined threshold may avoid unnecessary adjustments for insignificant changes and also save resources and computing power. The predetermined threshold may be generated by the user, automatically by the control circuitry 220 and/or 228, or by an AI or ML engine based on what thresholds may be used by others. For example, the predetermined threshold may be a percentage, such as 5, 10, or 20%. It may also be a change in the number of people, or a number of new objects introduced into the space (or taken away from the space). The threshold may also be a decibel level, e.g. the noise should exceed a certain decibel level or a delta from the baseline decibel level for it to be considered a threshold change.

If a determination is made, at block 430, that the environmental change does not exceed a predetermined threshold, then, at block 435, the control circuitry 220 and/or 228 may continue to play the audio from the audio source at the baseline calibrated settings.

However, if a determination is made, at block 430, that the environmental change exceeds the predetermined threshold, then, the control circuitry 220 and/or 228 may determine to perform a recalibration of the audio source for the listening position. Prior to performing the recalibration, the control circuitry 220 and/or 228 may determine, at block 440, whether the listening position has changed to a new location and if that change in location exceeds a threshold. This may involve determining both whether the listening position has changed to a new location, and if so, whether the change in location exceeds the threshold. Because small and insignificant changes in the listening position, such as smaller displacements which may include the person moving slightly to the left or right, may not greatly affect their sound quality, recalibrating to a new listening position may only be performed if the change in listening position's location to the new listening position exceeds a threshold, in other words if the displacement from the listening position's location to the new listening position exceeds a threshold.

In yet another embodiment, at block 440, a determination may be made that there is a change in listening position that exceeds a threshold change. This change includes a change in displacement of the user, which includes displacement of location, orientation, pose, and direction of the user. For example, the user may have moved from the sofa in block 101 in FIG. 1 to a second position that may be adjacent to the bookshelf 2, or the user may have faced a different direction. In this example, there may be no other changes to the environment that exceed a threshold, e.g., the furniture and other object may stay relatively in their same place and the only significant change may be the change in listening position. Since a sound map may have already been created at baseline calibration which identifies sound characteristics at bookshelf 2 (which may have been measured by the home assistant placed in a shelf of the bookshelf 2), recalibration may be done by using the previously created sound map to direct the sound to the new listening position, i.e., bookshelf 2, without performing additional steps.

If a determination is made at block 440 that the change in listening position does not exceed a threshold, e.g., a threshold displacement, then the control circuitry 220 and/or 228, at block 435, may perform recalibration to the old listening position, which is the listening position occupied during the baseline calibration.

If a determination is made at block 440 that the change in listening position exceeds the threshold, e.g., a threshold displacement, then the control circuitry 220 and/or 228, at block 450, may obtain coordinates of the new listening position, which is a listening position to which the user has displaced after the baseline calibration, and, at block 460, perform recalibration to the new listening position.

In some embodiments, recalibration may be performed in the same manner, e.g., using the same equipment and techniques, as used for performing the baseline calibration. It may be performed based on the physical layout and the spatial sound map using the techniques described above. For example, a tone may be emitted from the audio source and measured for the new listening position (e.g., the second listening position) for which recalibration is to be performed. The sound characteristics of the sound from the audio source may be adjusted based on the measurements obtained at the new listening position. In other embodiments, recalibration may be performed using different equipment and techniques than those used for performing the baseline calibration. In some embodiments, recalibration may be performed automatically, in-real time when the change exceeds the predetermined threshold, and without any user intervention. In other words, the recalibration process may be fully automated and designed to be performed in real-time, minimizing any disruption to the user's listening experience by dynamically adapting to environmental changes in real-time and be repeated each time there is a change that exceeds the predetermined threshold, including any changes in displacement of the user that exceeds the predetermined threshold.

Although both changes in environment at block 430 and changes in listening position at block 440 have been described in FIG. 4, any one change, e.g., either change in the environment or displacement in listening position that exceeds a threshold may trigger the automatic recalibration process.

Figure 5:
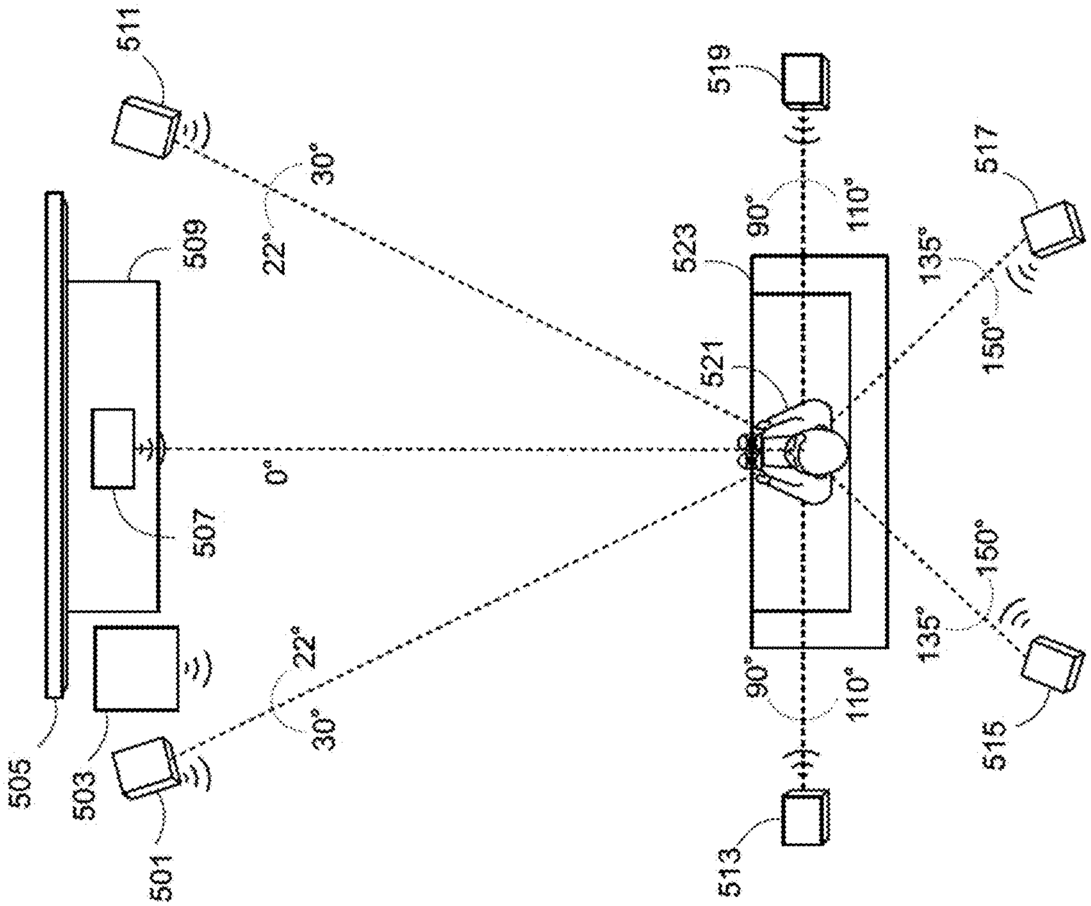
FIG. 5 is an example of a surround sound setup that may be used for performing auto-recalibration, in accordance with some embodiments of the disclosure.

FIG. 5 is an example of a surround sound setup that may be used for performing auto-recalibration, in accordance with some embodiments of the disclosure. In this example, a Dolby 7.1 configuration, which includes a set of speakers (501, 503, 507, 511, 513, 515, 517, and 519) or a combination of a soundbar 507 and a few additional speakers to recreate a recorded soundscape, is depicted. To calibrate and recalibrate these speakers, if a change in environment that exceeds the threshold is detected, which includes a displacement in the listening position that exceeds the displacement threshold is detected, each of the speakers (501, 503, 507, 511, 513, 515, 517, and 519) may be calibrated to the listening position. They may be calibrated in parallel or one at a time. The calibration and recalibration may be repeated until all the speakers (501, 503, 507, 511, 513, 515, 517, and 519) have been calibrated to the listening position. The process of calibration and recalibration is described in FIGS. 1, 4, and 6.

If calibration of the speakers (501, 503, 507, 511, 513, 515, 517, and 519) is done in parallel, the A/V receiver may generate multiple tones simultaneously, targeting different audio sources in the spatially mapped space. For example, the A/V receiver may generate a 200 Hz tone for speaker 501, a 300 Hz tone for speaker 503, etc. The tones may be played sequentially or all at the same time by the A/V receiver. On the receiving end, a simple rejection filter may be used to isolate the sound signature sent to each speaker (501, 503, 507, 511, 513, 515, 517, and 519). The listening devices may then measure and record these tones from each speaker (501, 503, 507, 511, 513, 515, 517, and 519) and calibration or recalibration may be performed based on the measured data.

FIG. 6 is a flowchart of a process for performing a calibration using a robotic assistant, in accordance with some embodiments of the disclosure. The process 600 may be implemented, in whole or in part, by systems or devices such as those shown in FIGS. 2 and 3. One or more actions of the process 600 may be incorporated into or combined with one or more actions of any other process or embodiments described herein. The process 600 may be saved to a memory or storage (e.g., any one of those depicted in FIGS. 2 and 3) as one or more instructions or routines that may be executed by a corresponding device or system to implement the process 600.

In some embodiments, process 600 involves communications between a user 601, smart home controller 603, robot assistant 605, and an A/V receiver 607. In some embodiments, user 601 may initiate a command for a baseline calibration by uttering the words "calibrate my speakers" at 609. The smart home controller 603 may then, at 611, transmit instructions to robot assistant 605 for detecting and measuring tones that are to be produced by the AV receiver 607. The smart home controller 603, at 615, may also send instructions to the AV receiver 607 for powering on and switching to calibration mode.

Upon receiving the instructions from the smart home controller 603, at 613, the robot assistant 605 may move to the listening area for detecting the tones emitted by the AV receiver. The AV receiver at 623 may generate calibration tones for different speakers within the spatially mapped space. The robot assistant 605 may then detect a calibration tone, at 625. The robot assistant may then move to a second location, at 625, to again detect a calibration tone. The robot assistant 605 may continue to move at 629, 631, 633, 635, and 637 through various positions in the spatially mapped space to detect calibration tones and then move back to its original location thereby covering the entire spatially mapped space.

In some embodiments, when there are multiple speakers in the spatially mapped space, the process from 613 to 637 may be repeated until all the speakers in the spatially mapped room have been calibrated. In some embodiments, the robot assistant 605 may provide the speaker map to the smart home controller 603, and the smart home controller 603 may then transmit it to the AV receiver for generating different tones for all the speakers.

When a calibration for one speaker is finished at 639, the AV receiver may be informed at 641 to generate a calibration tone for the next speaker, such as by using the provided speaker map, in the spatially mapped space. Once their robotic assistant moves throughout the space and captures all the calibration tones for all the speakers, then the calibration process may end at 645. Depending on the results of the calibration, the channel parameters may be updated by the AV receiver.

Figure 7:
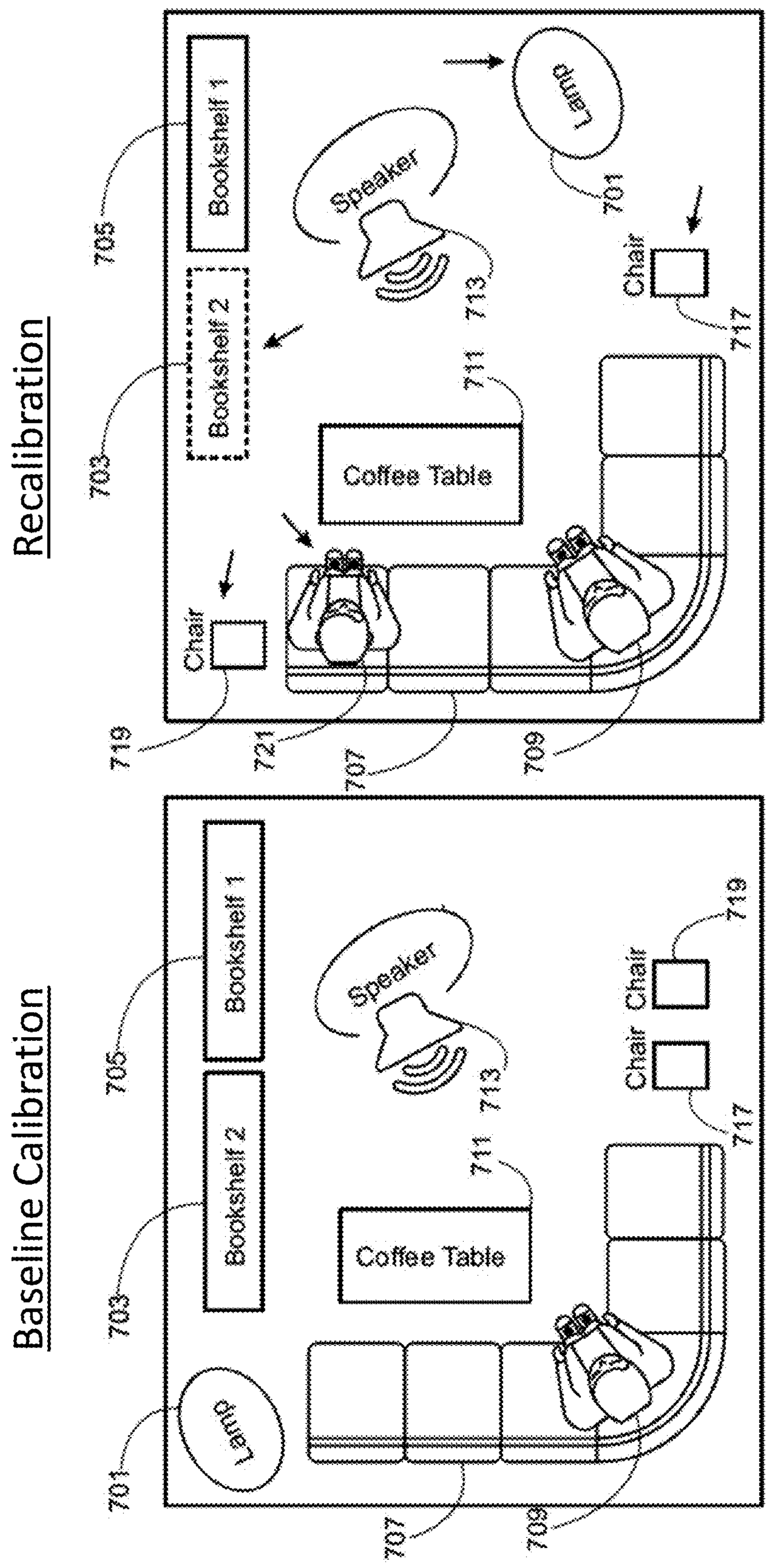
FIG. 7 is an example of spatial layout of a space at the time of performing a baseline calibration and the recalibration, in accordance with some embodiments of the disclosure.

FIG. 7 is an example of spatial layout of a space at the time of performing a baseline calibration and the recalibration, in accordance with some embodiments of the disclosure. As depicted on the left side of FIG. 7, at the time of the baseline calibration, physical layout of the space may indicate the locations of a sofa 707, lamp 701, bookshelves 703 and 705, a coffee table 711, a plurality of chairs 717 and 719, an audio source 713, and a person 709 sitting on the sofa 707. Subsequent to the baseline calibration, at a later time, a determination may be made that a change in environment has occurred. As depicted, the change includes moving up the chair 719 to a new location, moving of the lamp 701 to a new location, introduction of a second person 721 sitting on the sofa 707, and removal of the bookshelf 703. If such changes are determined to exceed a predetermined threshold, then the system may automatically and in real-time perform recalibration of the audio source 713 to a listening position, which may be 709. As described earlier, if the listening position changes subsequent to the baseline calibration, then based on the changes in the environment exceeding the predetermined threshold, the system may calibrate audio source 713 to the new listening location.

Figure 8:
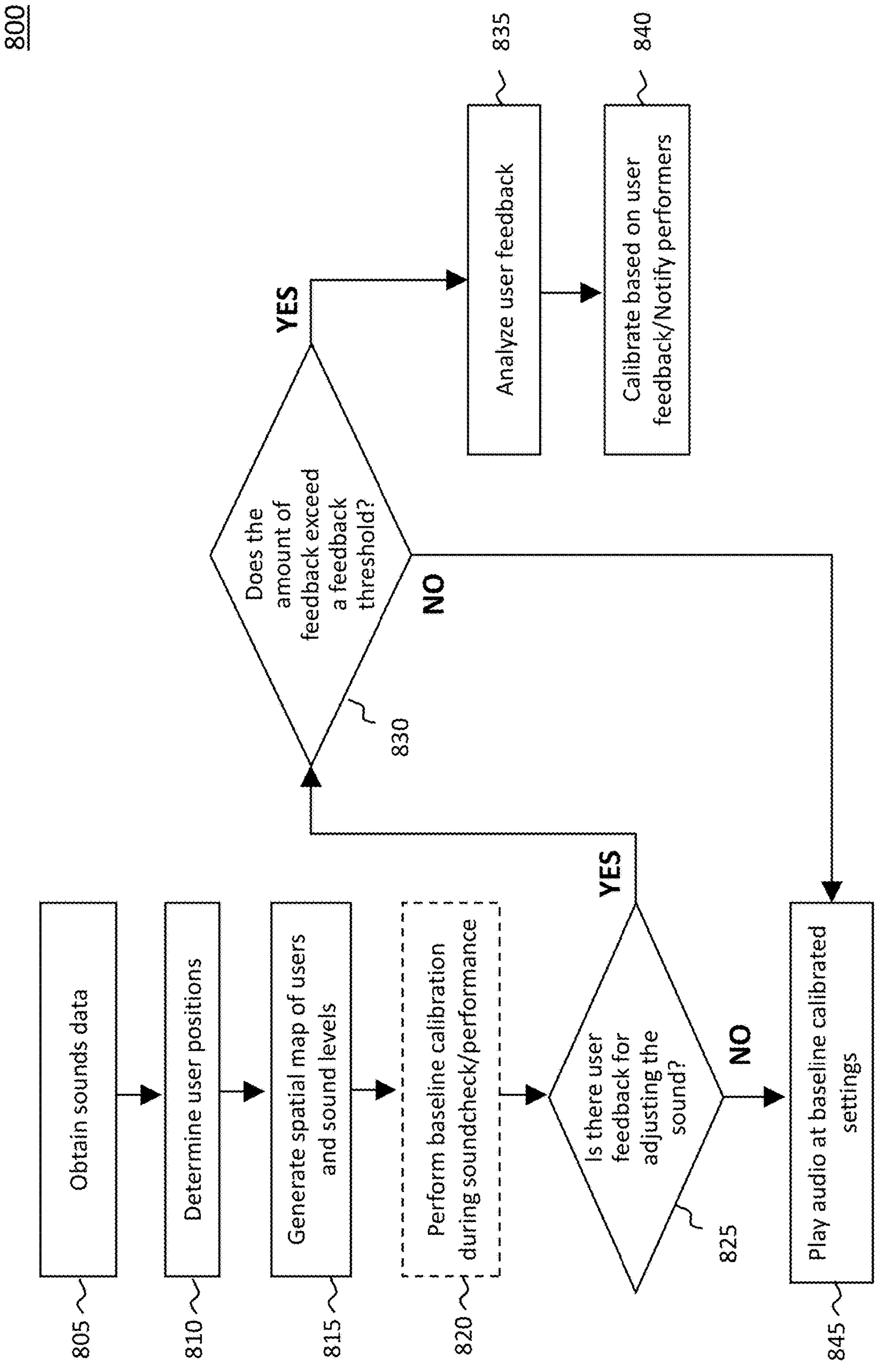
FIG. 8 is a flowchart of a process for performing a calibration at a live event where a plurality of users and devices are located within a space, in accordance with some embodiments of the disclosure.

FIG. 8 is a flowchart of a process for performing a calibration in a live event where a plurality of users and devices are located within a space, in accordance with some embodiments of the disclosure. The process 800 may be implemented, in whole or in part, by systems or devices such as those shown in FIGS. 2 and 3. One or more actions of the process 800 may be incorporated into or combined with one or more actions of any other process or embodiments described herein. The process 800 may be saved to a memory or storage (e.g., any one of those depicted in FIGS. 2 and 3) as one or more instructions or routines that may be executed by a corresponding device or system to implement the process 800.

In some embodiments, the control circuitry 220 and/or 228 may calibrate and adjust sound reproduction during a live event controlled by a Digital Audio Workstation (DAW) or streamed to an A/V system for optimal audio comfort based on the enrollment of mobile audio devices to measure sound characteristics at various locations. The process for doing so may include, in some embodiments, obtaining sound data at block 805. The control circuitry 220 and/or 228 may obtain such sound data by using a plurality of mobile devices, such as smartphones and smartwatches, that are in the space where the audio source is located or where the live event is being held. The control circuitry 220 and/or 228 may use such mobile devices to monitor sound quality, such as during a sound check or performance.

At block 810, the control circuitry 220 and/or 228 may determine user positions based on detecting locations of the user's mobile devices, such as based on the mobile device's GPS signals. In some embodiments, the control circuitry 220 and/or 228 may use Bluetooth or Wi-Fi positioning to approximately determine the location of each mobile device within the space.

At block 815, the control circuitry 220 and/or 228 may generate a physical layout of the area of the live event. The physical layout may identify the location of the users as well as the audio sources and their sound levels. Data obtained from smart cameras, such as images of a crowd in the live event, GPS signals of the phone, sound propagation techniques to determine user location, may be some of the techniques used to identify the location of the user, their devices, and the audio sources.

The mobile devices associated with the users may receive sound emitted from the audio sources, such as the speaker on a stage, measure the acoustic characteristics of the sound and report it to the central control unit or application. To collect such sound data as observed by the mobile devices, in some embodiments, when incorporated into devices at an OS level, users (concertgoers for example) may receive a notification, requesting permission to collect sound level data during the performance. Data collected may include noise level in decibels, frequency analysis as well as other sound quality data. This notification may, for example, come from a subscription music application, such as Spotify or Apple Music. Using the embodiments, such applications may also be able to venture into "live music."

At block 820, a baseline calibration may be performed based on the sound data collected from the mobile devices. Such baseline calibration may be performed during the soundcheck or initial phase of the concert. It may also be performed at any time during the concert. The baseline calibrations may include adjusting, for example, the tone, frequency, volume, timing, and other characteristics of sound. If the sound involves playing of music, in which a plurality of instruments may be played together, adjusting may also include adjusting a tone, frequency, volume, speed, and other sound characteristics of only a specific instrument. For example, the volume of the drums may be turned down if it overpowers such that other instruments cannot be heard clearly by a person located at the listening position.

At block 820, a baseline calibration may be performed based on the sound data collected from the mobile devices. Such baseline calibration may be performed during the soundcheck or initial phase of the concert. It may also be performed at any time during the concert. The baseline calibrations may include adjusting various audio settings to compensate for space acoustics, speaker placement, crowd of people, etc. In some embodiments, to perform a baseline calibration for a live event (such as a live concert or theater performance), some of the same equipment and techniques as discussed in performing a baseline calibration for a living room may be used. In other embodiments, since the baseline calibrations for a live event may involve different dynamics and environment, e.g., and environment which may not be confined by walls, the techniques used may differ from those used to perform the baseline calibration of a living room described earlier. For example, feedback from the crowd, e.g., from the plurality of devices associated with user in the crowd, may be used to determine the type and extent of calibration to be performed.

In some embodiments, the step of baseline calibration 820 may be skipped and calibration may be performed after receiving feedback from the plurality of devices in the crowd in the live event.

At block 825, a determination may be made if user feedback for adjusting the sound is received. In the event baseline calibration is already performed, such as at the sound check stage, then in the absence of any user feedback, the audio may be played at the baseline calibrated settings, as depicted at block 845.

However, if a determination is made at block 825, that user feedback for adjusting the sound is received, then a second determination may be made at block 830. This determination, at block 830, may involve determining whether the amount of feedback received exceeds a feedback threshold. In one embodiment, the feedback threshold may be exceeded based on sound properties measurement estimation at various locations in the venue. In this embodiment, data relating to sound properties of the sound propagated by the audio source, as measured by a collection of devices, may be obtained. Based on the obtained sound data, an estimation of sound at various locations may be made. For example, an estimation may be made, based on the collected data from the collection of devices, that sound at a particular location in venue is below a certain decibel level. As such, based on the estimation, the decibel level may be automatically adjusted such that it is at a desired level at the particular location. In another embodiment, the feedback threshold may be exceeded based on collective opinion of the input provided by devices in the venue. Although the description above used decibel level to explain the concept, the embodiments are not so limited and any other sound characteristic, which may be estimated for a location, may be measured and calibrated if it does not measure to the estimated value. In this embodiment, since it is a live event, feedback from only a single individual in the crowd or a small minority of the crowd may not be the opinion of the majority, as such, adjustments to the sound quality and its related calibration may be made only if they affect a predetermined number or people in the crowd. Such a predetermined number, referred to in this figure as the feedback threshold, may be based on a certain percentage of the crowd, such as at least 5%, 10%, 20% of the crowd. In other words, since feedback from only a single individual in the crowd or a small minority of the crowd may not be the opinion of the majority, a determination may be made whether the feedback received from the plurality of devices exceeds a number threshold. In response to determining that the feedback received exceeds the number threshold, calibrating the sound characteristics of sound propagated from the audio source based on the received feedback may be performed such as for the second listening position. As such, at block 830, if a determination is made that user feedback does not exceed a feedback threshold, then, the audio may be played at the baseline calibrated settings, as depicted at block 845.

If a determination is made at block 830 that the number of people that provided the feedback for a particular characteristic of sound exceeds the feedback threshold, then further analysis of the feedback may be performed at block 835. This analysis may include determining the type of feedback, e.g., a critical number of people wanting the volume adjusted to a higher level, etc. Based on the analysis of the feedback, calibration may be performed at block 840 by adjusting the characteristic of the sound for which feedback was received. In some embodiments, few people in the crowd may want the volume to be at 9 and others to be at 8 and yet a few others for it to be at 6. The control circuitry 220 and/or 228 may take an average, mean, standard deviation of the feedback and determine the calibration for the volume level using any one of such methods. Since location of the plurality of devices may be determined, such as during sound check, the recalibration may be focused to a listening position that is central to the plurality of devices. For example, the control circuitry 220 and/or 228 may take an average, mean, standard deviation of distances between devices and determine an optimal listening position that is central to all the devices that provided the feedback. In another embodiment, location of the plurality of devices may have changed after the initial soundcheck or a soundcheck may not have been performed at all. For example, a mass of people with the devices may have move to another location. As such, the location of the devices may be determined (or redetermined if it was previously determined) and recalibration may be focused to a listening position that at a central location based on the determined location of the plurality of devices.

In some embodiments, if the feedback relates to adjustment of a particular instrument, such as the guitar because its sound is not clear to a percentage of the crowd or the estimated sound characteristics, as measured by the collective device is not to a level as desired by the musicians, or the drums are too overpowering such that other instruments cannot be heard, such feedback may be provided to the mixing board and/or the performers in real-time such that sound adjustments, as necessary, may be made. In one embodiment, when determined that a particular instrument is above a threshold, that individual instrument may be adjusted in order to remain within the acceptable range. If the performer of the live event has access to a digital foot pedal, tablet or other such device, a notification may be shown, or other indicator may be displayed to inform the performer that their instrument is exceeding the range and may be lowered. The central control unit (of the mixing board) or application utilizes the positional data and sound feedback to create a spatial sound map of sound levels within the venue. This map helps in understanding the acoustic characteristics of the space and informs the adjustments needed for optimal sound distribution. In some embodiments, the control circuitry 220 and/or 228 may use an AI engine to analyze the feedback received from the plurality of devices and based on the suggestions from the AI engine, transmit a suggestion to the musician directing them on which instrument to tune or change sound characteristics, including the values to change. The process of calibrating or calibrating upon receiving user feedback that exceeds a threshold, may be performed on a continuous basis. Accordingly, the system may continuously refine the audio output during the performance, adapting to changes in crowd density and positioning, thus maintaining a consistent and enjoyable auditory experience. Additionally, users who have opted their devices in to participating in the live event, may be presented with a user interface allowing them to indicate if the sound is too low, just right or too loud. The system could consider this individual user feedback in addition to the monitored data.

In addition to calibrating based on user feedback, as described above, the system may also analyze historical data from past performances, density of devices and spatial sound data for a particular venue. For example, the system may compare a previously generated spatial sound map to a currently generated spatial sound map to identify differences in sound characteristics. Using this data analysis, the system may predict and preemptively adjust to common acoustic challenges for specific venues.

Figure 9:
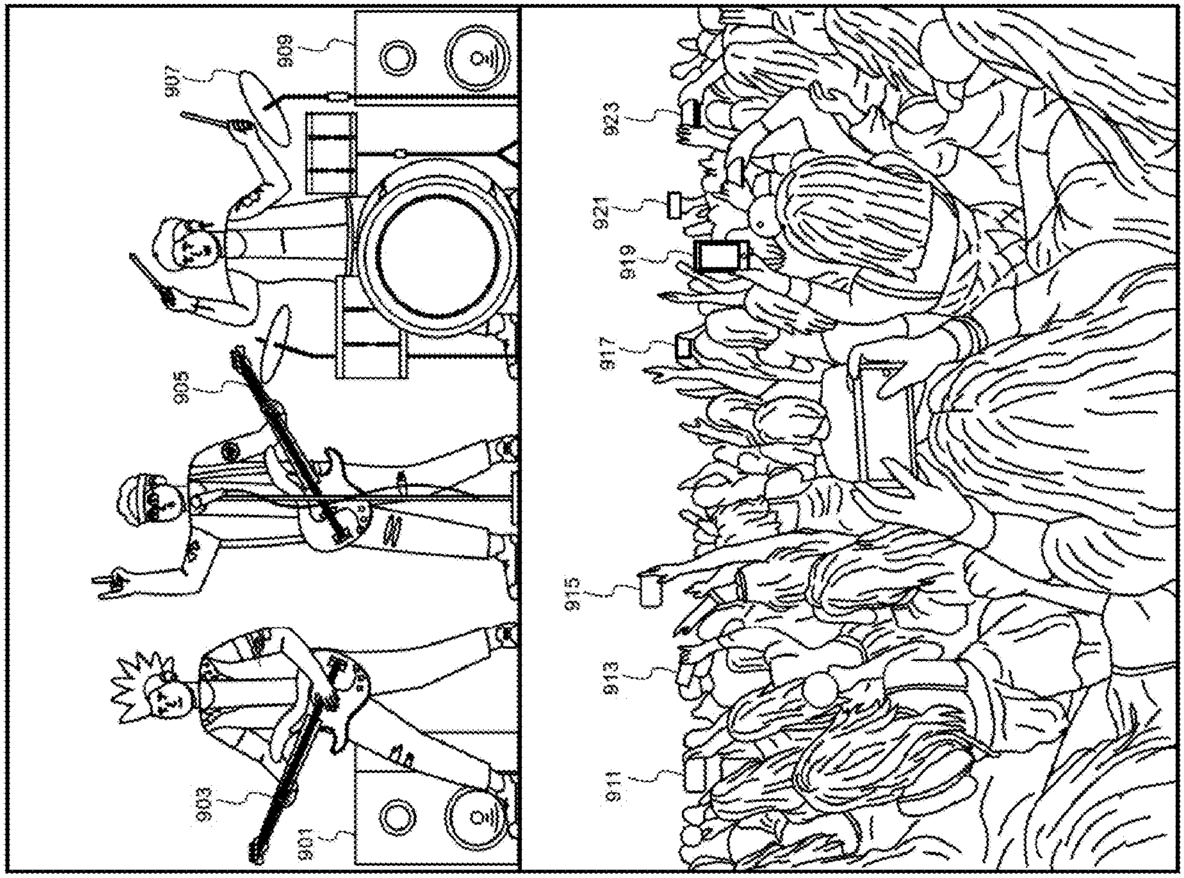
FIG. 9 is an example of a live event for which a sound calibration may be performed.

FIG. 9 is an example of a live event for which a sound calibration may be performed. In some embodiments, the live event may include a band which has a plurality of performers having a plurality of instruments, such as guitar 903, bass 905, drums 907, whose sound output may be through speakers 901 and 909. In this embodiment, several members of a crowd may be listening to the music played by the performers using their music application, such as Spotify, on their devices 911-923. The process of calibrating sound for such a live event where a large crowd is present is described in FIGS. 8 and 10. In one embodiment, the calibration performed may involve users in the crowd through their devices consuming the sound from speakers 901 and 909 and then providing feedback. In one embodiment the feedback may trigger automatic calibrations to the sound if the feedback exceeds the feedback threshold. In another embodiment, the feedback may be provided to the musicians directly on their devices such that they can modify characteristics of sound as desired by the feedback.

In some embodiments, a determination may be made whether the device at a venue that is used to measure the sound characteristics of the sound propagated by the audio source is hindered or unhindered. Examples of a hindered device may include the device located in a pant pocket, in a purse, covered with a cloth or blanket, etc. Example of an unhindered device may be the device held in the user's hand, by the user's ear, or held above their shoulders, such as when a user may typically have the device's flashlight on (such as at 915) and use it to wave and show support to the musician for their music. An unhindered device may also be any device that is open to the surroundings and not covered by any obstruction. A detected whether the device is hindered on unhindered may be based on sensors in the device. For example, if the device, based on its sensors, detect a human touch, such as the hand or ear of a human, a determination may be made that the device is unhindered. Likewise, if the gyroscope in the device detects the device at a particular elevation, which may be due to the user holding it up high, then, a determination may be made that the device is unhindered. Furthermore, if the flashlight of the device is on, such as at 915, which may be due to the user waving the device in support of the music, then, a determination may be made that the device is unhindered. In yet other embodiments, if the device, based on its sensors, does not detect a certain type of heat, which is generated by human touch, it may determine that the device is hindered. Data relating to whether the device is hindered or unhindered may be used in determining whether the sound characteristics as measured by the device should be considered in determining recalibration. For example, if the device is in the pant pocket or buried inside a purse, and the data indicates that sound level is below a decibel level, then such data may not be used since the lower decibel level may be caused due to the device being hindered.

Figure 10:
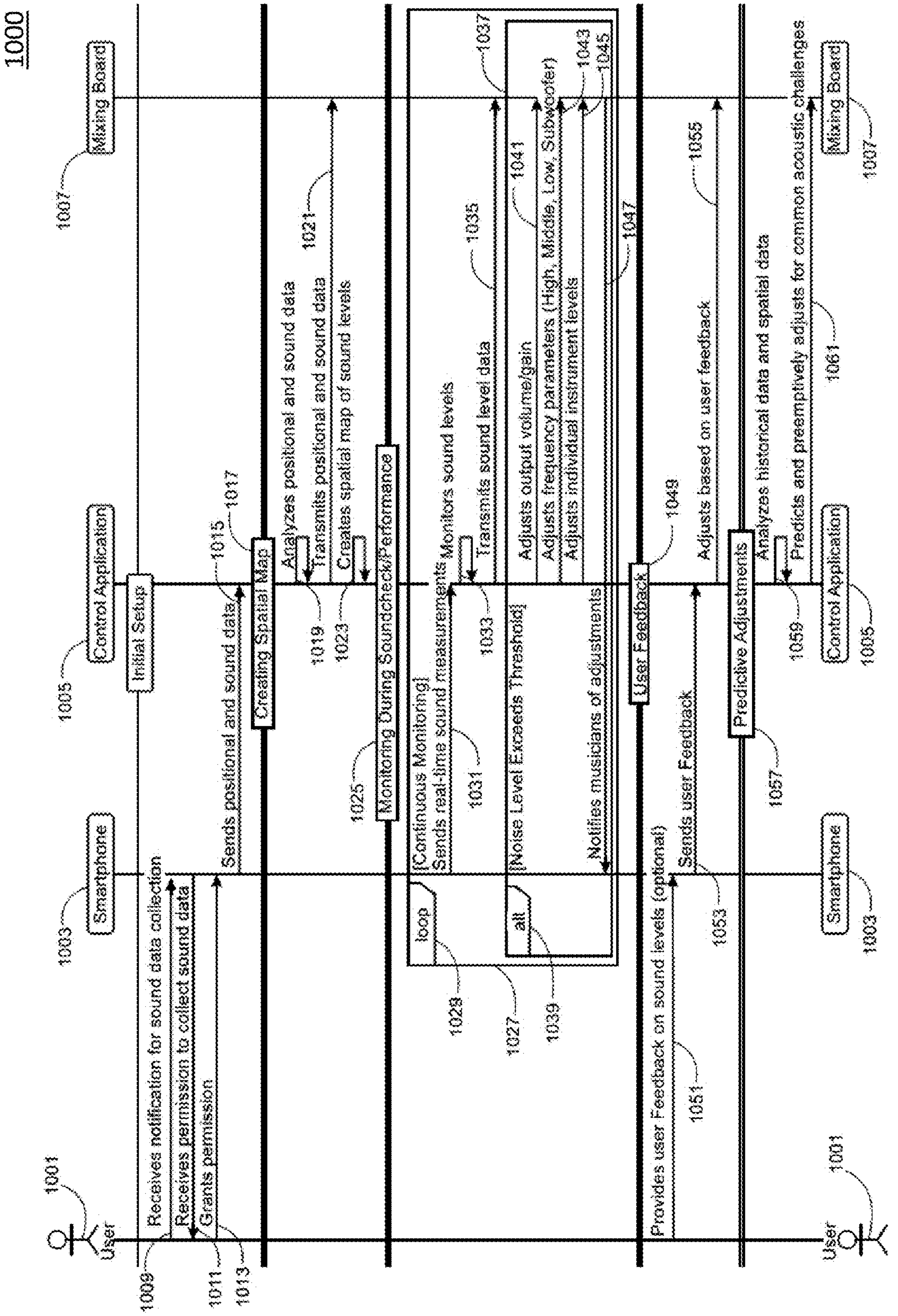
FIG. 10 is a flowchart of a process for performing a calibration at a live event where a plurality of users and devices are located within a space, in accordance with some embodiments of the disclosure.

FIG. 10 is a flowchart of a process 1000 for performing a calibration in a live event where a plurality of users and devices are located within a space, in accordance with some embodiments of the disclosure. The process 1000 may be implemented, in whole or in part, by systems or devices such as those shown in FIGS. 2 and 3. One or more actions of the process 1000 may be incorporated into or combined with one or more actions of any other process or embodiments described herein. The process 1000 may be saved to a memory or storage (e.g., any one of those depicted in FIGS. 2 and 3) as one or more instructions or routines that may be executed by a corresponding device or system to implement the process 1000.

In some embodiments a smartphone 1003 associated with their user 1001 may receive a notification for collecting sound data. The user associated with the smartphone at 1011 and 1013 may grant permission allowing the collection of sound data. The smartphone may then collect the sound data and transmit both the collected sound data as well as the smartphone's GPS location, at 1015, to the control application 1005. The process of steps 1009-1015 may be performed during an initial setup A spatial sound map the identifies locations of the collected sound data may be generated and used. For example, after the initial calibration, spatial sound maps generated at baseline calibration and at a subsequent time may be compared to determine which sound characteristic is to be changed to deliver the same or similar acoustic experience to the users.

At 1023 a spatial sound map for the area may be created. The spatial map may be created based on analyzing positional and sound data at 1019. The positional and sound data may also be transmitted by the control application 1005 to the mixing board 1007, similar to notifying the performers of the user feedback in block 840 of FIG. 8.

At block 1025, the sound characteristics during the sound check stage, which may be the starting or set up stage for a band, may be monitored. The monitoring may continue during the performance of the band as well. The monitoring may involve the control application 1005 receiving real-time sound measurements from the smartphones 1003, such as at 1031. Based on the real-time measurement, and if the sound level exceeds a threshold, adjustments to the sound may be made through steps 1035-1045. In addition, the musicians of the band may also be notified at 1047 to make adjustments to the sound based on the received sound measurements.

At block 1049, user feedback from the smartphones 1003 associated with users 1001 may be received. The user feedback, which is also described at blocks 825, 830, and 835 of FIG. 8, may include information on which sound characteristics the users prefer to be changed. If the user feedback exceeds a threshold number of users, as described in block 830 of FIG. 8, then such feedback may be transmitted to the mixing board 1007 for performing the corresponding calibrations for adjusting the sound.

In some embodiments, the control application 1005 may analyze historical data from past performances, density of devices and spatial data for a particular venue. Using this data analysis, the control application 1005 may predict the type of sound changes needed and transmit such data to the mixing board to preemptively adjust to common acoustic challenges for specific venues.

Figure 11:
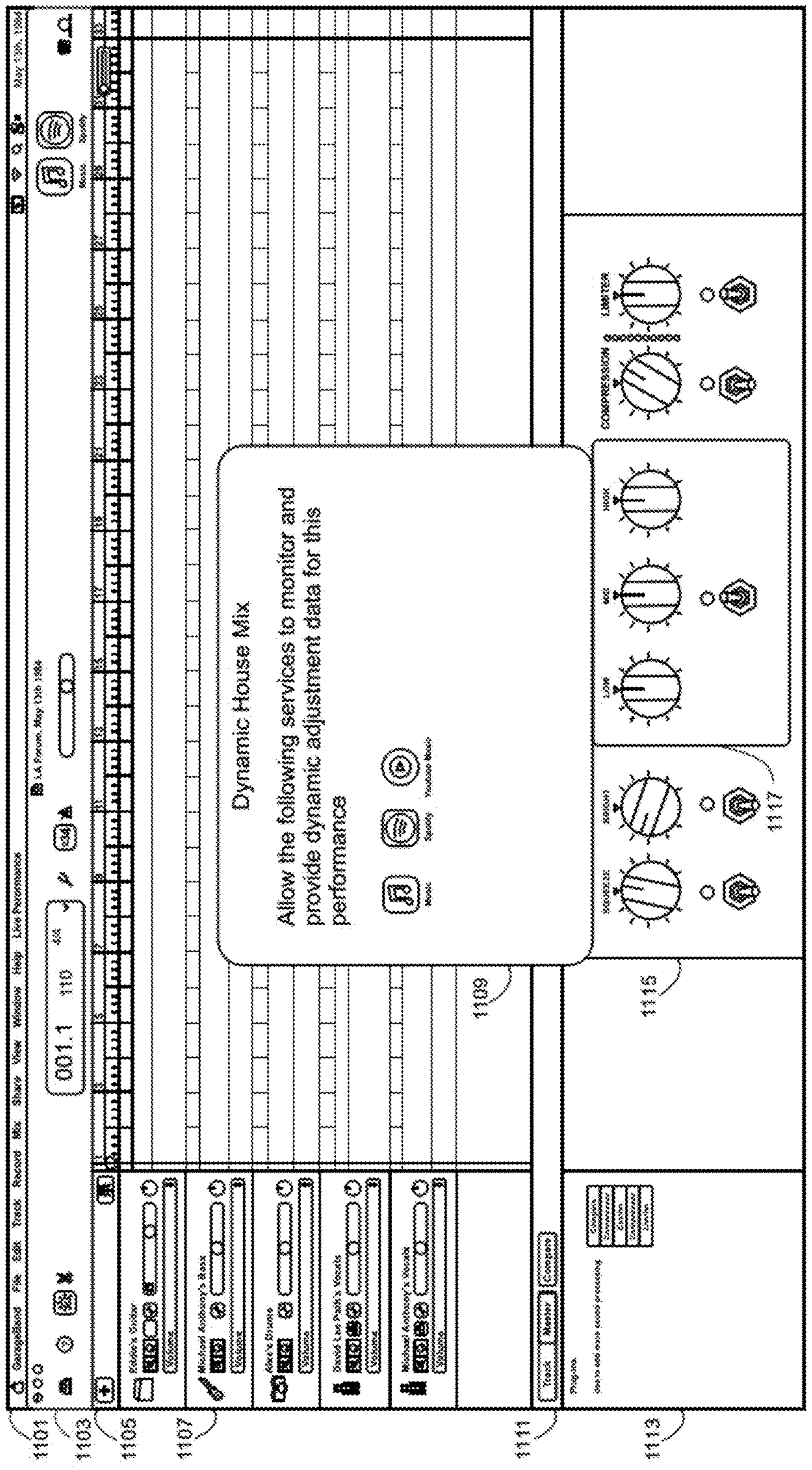
FIG. 11 is a block diagram depicting a mixing board that may be used in a live event to perform calibration, in accordance with some embodiments of the disclosure.
Figure 12:
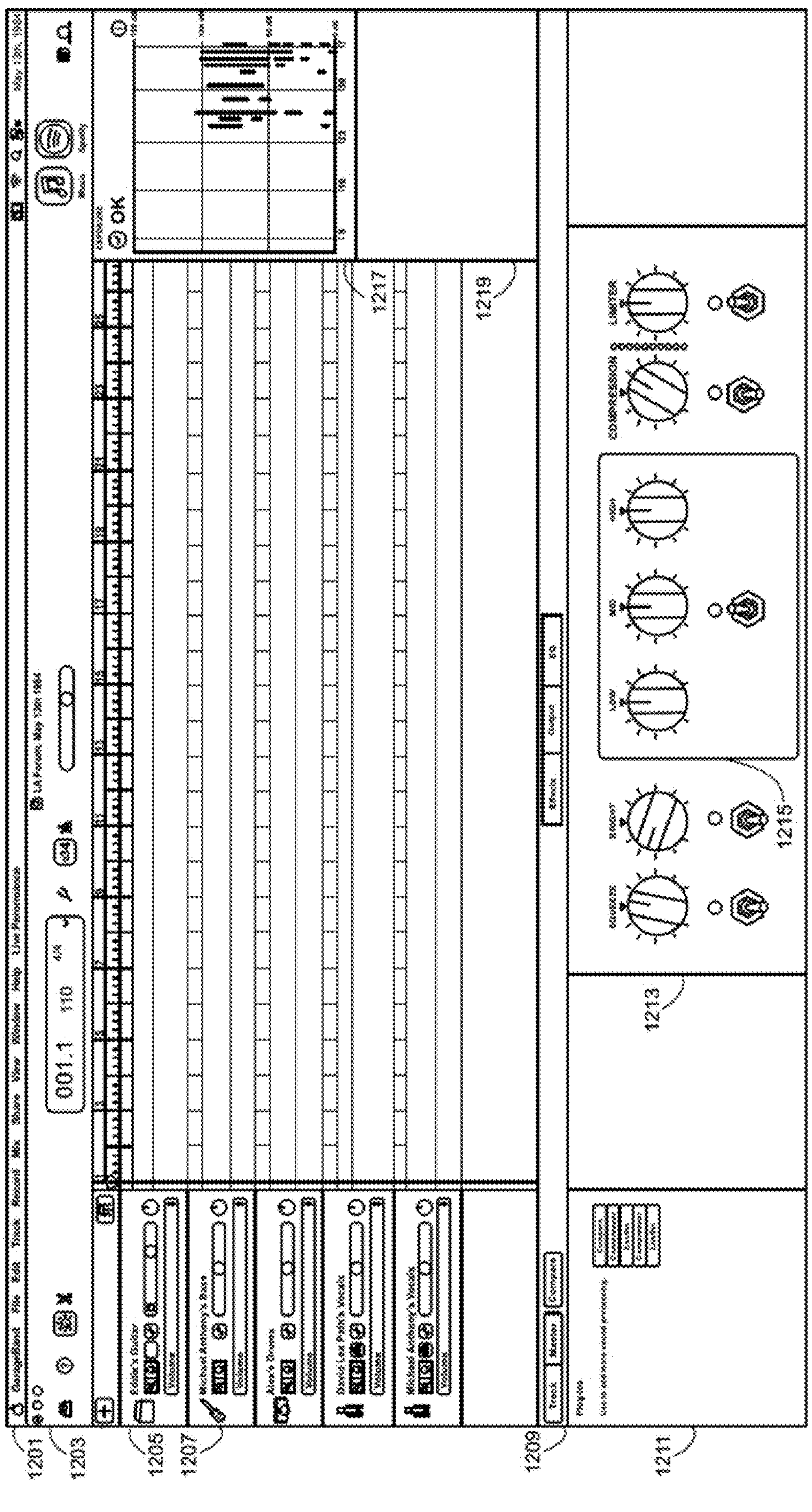
FIG. 12 is a block diagram depicting adjustments made to sound characteristics using a mixing board in a live event, in accordance with some embodiments of the disclosure.

FIGS. 11 and 12 refer to a mixing board where FIG. 11 is a diagram depicting a mixing board that may be used in a live event to perform calibration, in accordance with some embodiments of the disclosure and FIG. 12 is a block diagram depicting adjustments made to sound characteristics using a mixing board in a live event, in accordance with some embodiments of the disclosure. FIGS. 11 and 12, in some embodiments, may be graphical user interfaces for a sound control software application for measuring and calibrating sound as described in the embodiments herein. In some embodiments, the user interface may receive a notification, such as at 1109, to allow services to monitor and provide dynamic adjustment data for the performance. This type of user interface may be displayed on the musician or performer's device or the mixing board. The notification 1109 may inform or notify the musician that the DAW supports crowdsourced audio feedback, such as through services like Apple Music, Spotify and YouTube Music. By selecting one or more of these services, the DAW may take the audio feedback as input to adjust the sound mixing settings automatically and without user intervention. As such, if the automatic readjustment option is selected, Michael's bass may be automatically adjusted, such as by automatically adjusting various sound adjustment knobs and software tools (e.g., 1101-1107, 1111-1115, 1201-1219), by the associated control circuitry without Michael having to manually make any adjustments. In another embodiment, if a threshold number of users in the crowd indicate through their feedback that Eddie's guitar volume is too high and should be lowered, then the DAW may perform the automatic adjustments as described above and lower the guitar volume such that other instruments can also be heard. In some embodiments, an option may be provided to the musicians to approve the adjustments prior to the system automatically performing the above mentioned adjustments. In yet other embodiments, the musicians may be able to tweak the adjustment suggested and then approve such that the system may perform the adjustments based on the tweaking.

Figure 13:
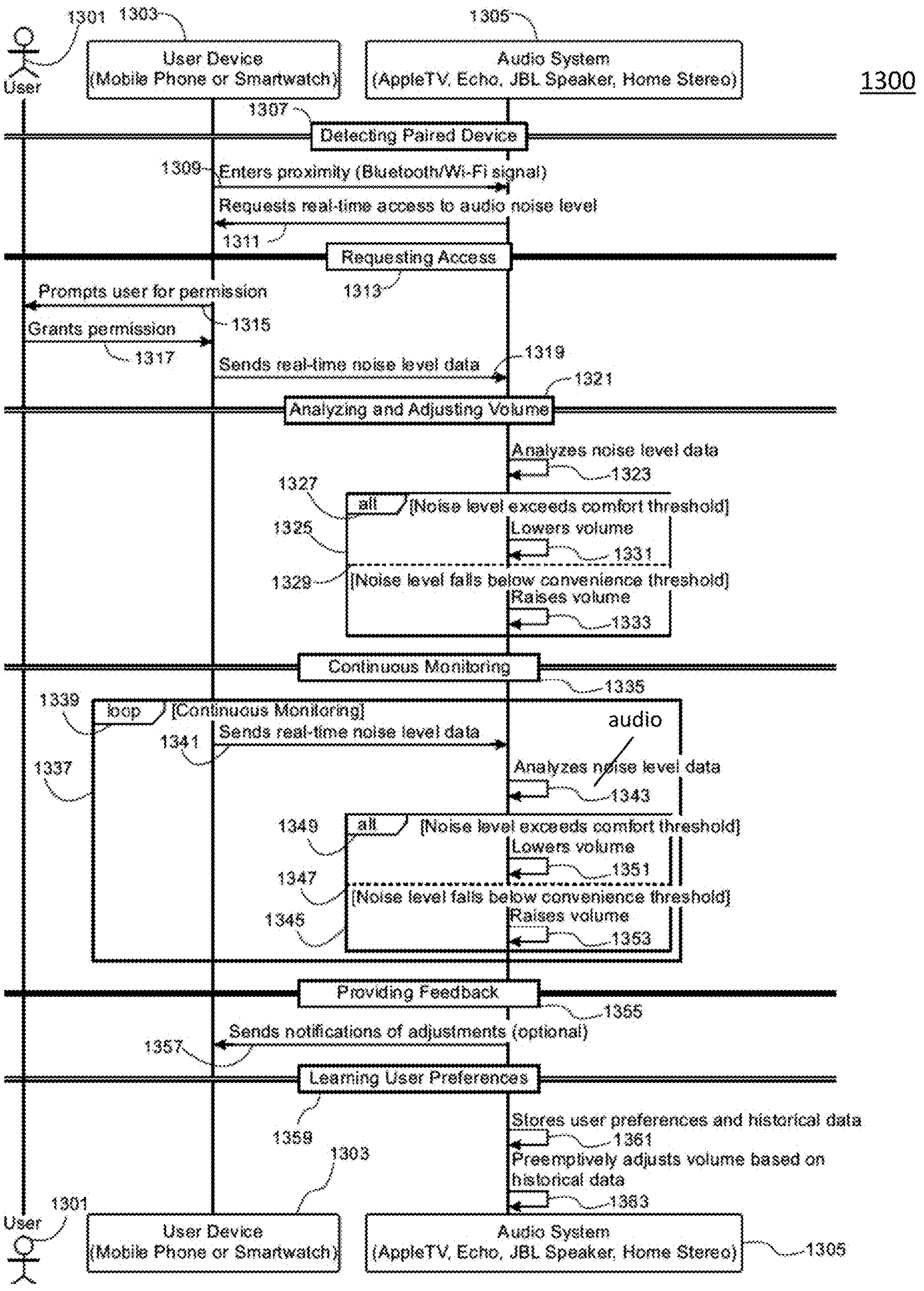
FIG. 13 is a flowchart of a process for performing a calibration when paired devices are used for listening to audio from an audio source, in accordance with some embodiments of the disclosure.

FIG. 13 is a flowchart of a process for performing a calibration when paired devices are used for listening to audio from an audio source, in accordance with some embodiments of the disclosure. The process 1300 may be implemented, in whole or in part, by systems or devices such as those shown in FIGS. 2 and 3. One or more actions of the process 1300 may be incorporated into or combined with one or more actions of any other process or embodiments described herein. The process 1300 may be saved to a memory or storage (e.g., any one of those depicted in FIGS. 2 and 3) as one or more instructions or routines that may be executed by a corresponding device or system to implement the process 1300.

In some embodiments, communication between a user 1301, user device 1303, and audio system 1305 is depicted in FIG. 13. In some embodiments, at 1307, a detection may be made that a user device 1303 is paired to listen to sound from the audio system 1305.

The detection may be made at 1309 based on the user device's proximity to Bluetooth and Wi-Fi signal and its request to the audio system 1305 to access the audio sound level in real-time.

At 1313, a request to access may be granted. The granting process may involve prompting the user for permission at 1315, receiving the permission at 1317, and upon receiving permission, sending real-time noise level data from the user device 1303 to the audio system 1305. This real-time noise level data may be measurements of sound that the user device 1303 determined based on the sound received from the audio system 1305.

At 1321, the control circuitry 220 and/or 228 may analyze and adjust the volume. To determine that the volume is to be adjusted, steps 1323-1333 may be performed. These steps include the audio system 1305 analyzing noise level data at 1323, determining whether the noise level exceeds a comfort threshold at 1325, and if it does, lowering the volume to a more comfortable level. Likewise, audio system 1305 analyzing noise level data at 1329 may determine that the noise level falls below a convenience threshold, and as such, raising the volume at 1353.

The control circuitry 220 and/or 228, at 1335, may continuously monitor the noise level to determine where they fall with respect to the comfort and convenience threshold, and accordingly make appropriate adjustments. The monitoring and adjusting process may use the steps 1339-1345.

In some embodiments, adjustment notification may be provided to the user device at 1355 and 1357. In yet more embodiments, the control circuitry 220 and/or 228 may learn user preference at 1359. This may be through previously storing user preferences and historical data at 1361 and preemptively adjusting volume based on the historical at 1363.

Figure 14:
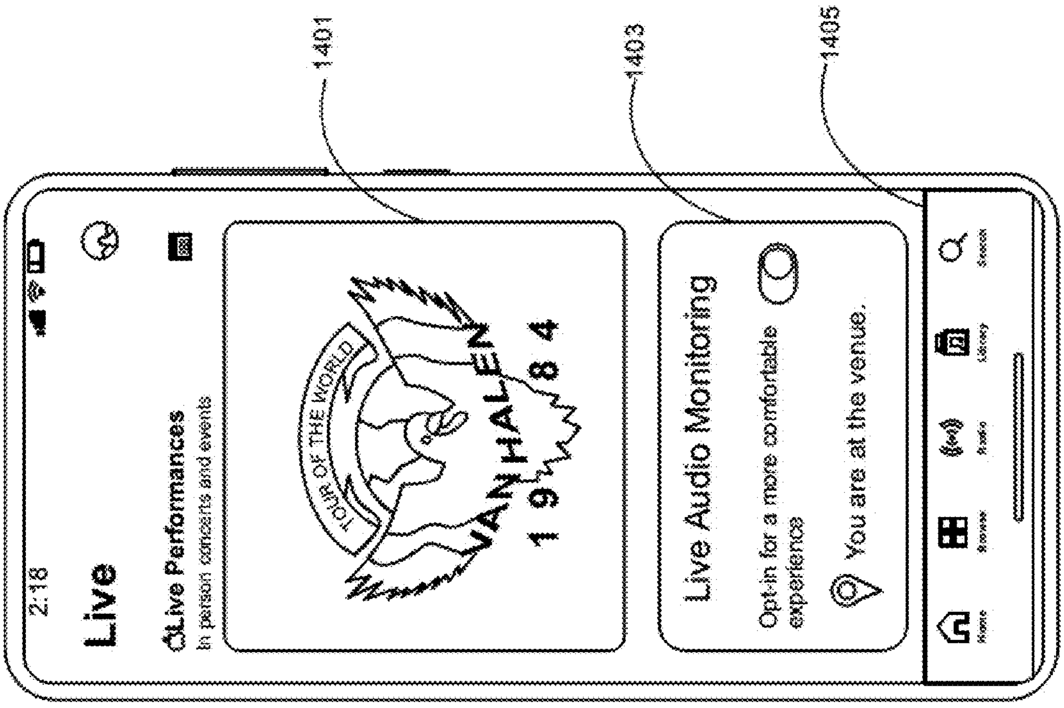
FIG. 14 is an example of a mobile device playing music using a music application, in accordance with some embodiments of the disclosure.

FIG. 14 is an example of a mobile device playing music using a music application, in accordance with some embodiments of the disclosure. In this embodiment, a user interface may be displayed for the user using the music application. Notifications, such as to opt-in or opt-out for receiving sound data, collecting, and providing sound data, may be displayed on the user interface. For example, if the user is at a live event, such as the live event displayed in FIG. 9 or described in FIGS. 8 and 10, the user may opt-in or out to measuring sound produced by the concert speakers and reporting the measurements to the control application for use to perform a calibration. Music applications, such as Spotify and others may accordingly implement the embodiments and provide the user a chance to participate in live concerts.

Figure 15:
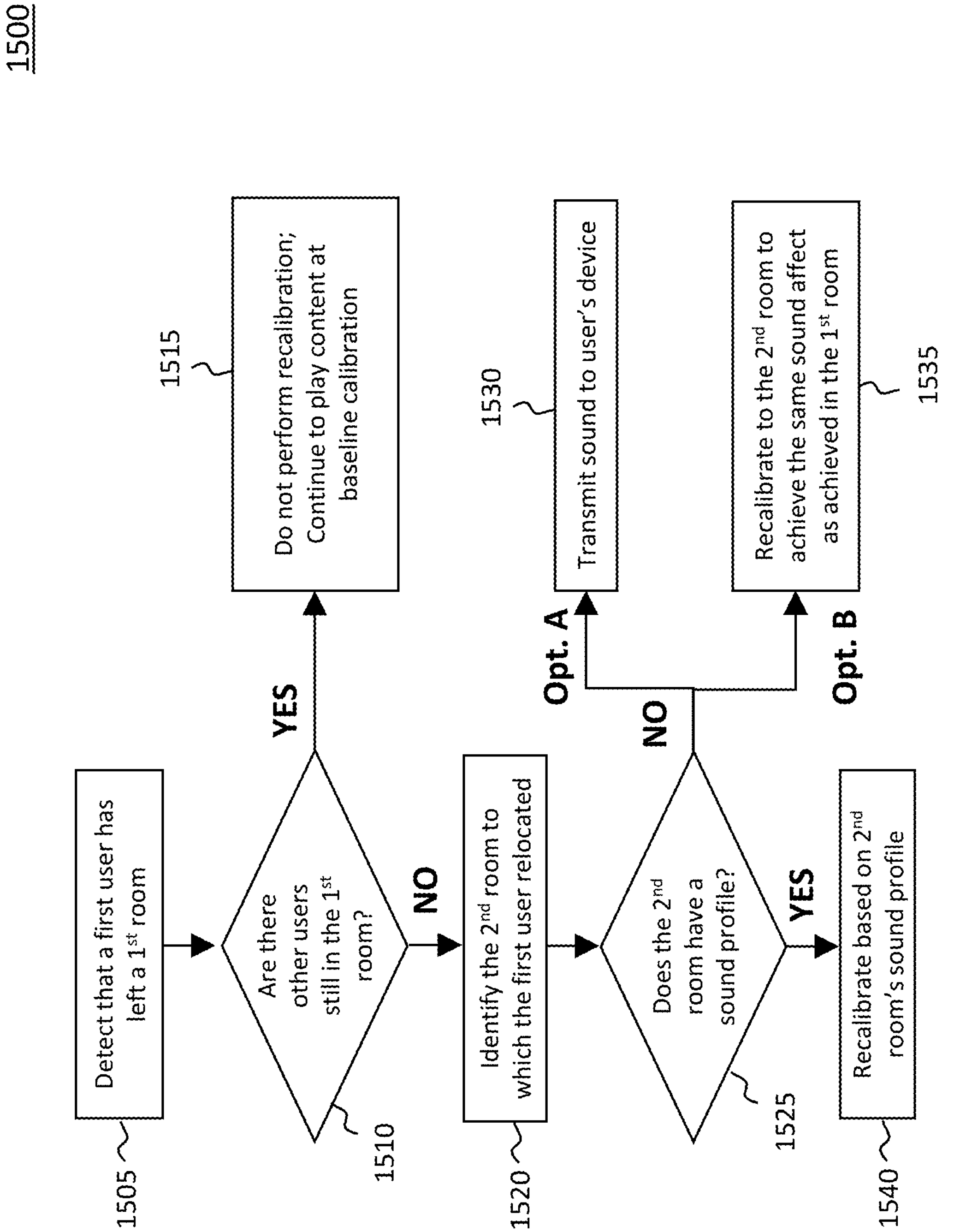
FIG. 15 is a flowchart of a process for recalibrating and determining whether to recalibrate or modify sound settings, in accordance with some embodiments of the disclosure.

FIG. 15 is a flowchart of a process for recalibrating and determining whether to recalibrate when a user moves to a new listening position, such as if the user leaves a first space, in accordance with some embodiments of the disclosure. The process 1500 may be implemented, in whole or in part, by systems or devices such as those shown in FIGS. 2 and 3. One or more actions of the process 1500 may be incorporated into or combined with one or more actions of any other process or embodiments described herein. The process 1500 may be saved to a memory or storage (e.g., any one of those depicted in FIGS. 2 and 3) as one or more instructions or routines that may be executed by a corresponding device or system to implement the process 1500.

In some embodiments, at block 1505, a detection may be made that a first user who was originally present during the baseline calibration has left the first space, such as a room, an office, a hall, or any other type of confined space. For example, the first user may have left the living room space depicted in block 101 in FIG. 1 where the audio source is located and travelled to another space in the house. The detection may be made using a variety of methods and equipment. For example, smart cameras in the spatially mapped and/or spatially sound mapped space may use image recognition techniques to track the first user's movement and detect based on the tracking that the first user has left the first space. In another embodiment, a device, such as a smartphone, associated with this first user may be tracked based on its wireless signal. As a signal moves from away from the first space, the detection may be made that the user along with their smartphone have left the first space. In some embodiments, the first user may verbally, or through a button on a user interface on their phone, indicate that they are leaving the space.

Once a determination is made that the first user has left the first space, another determination may be made at block 1510. This may be a determination of whether there are other users still in the first space after the first user has left the space. For example, the first user may have been watching a movie with their family or friends and gotten up and left the space to go to another space in the house, such as the bathroom or bedroom, or left entirely outside the house.

If a determination is made at block 1510 that there are still other users in the first space where the audio source is located, then at block 1515, a recalibration may not be performed and the sound from the audio source may be continued to be played at the baseline calibration. One of the reasons for not performing a recalibration may be to not change the sound setting in the space while others in the space are still consuming the content just because a single person has left the space. In another embodiment, if others in the space are not consuming the content, which may be determined based on their gaze tracked via the smart cameras, then recalibration may be done if the only person who was consuming the content has left the space.

If a determination is made at block 1510 that there are no other users in the first space after the first user has left the space, or no other users that are consuming the content, then, at block 1520, the system may identify the second space to which the first user has relocated.

For example, as indicated before, the second space may be a bathroom, a bedroom, or another space in the house. In addition to relocating into another space, the first user may have exited the house entirely to travel somewhere away from the house.

At block 1525, a determination may be made whether the second space to which the user has relocated to has a sound profile. The sound profile of a space may indicate the types of sound characteristics that are acceptable for the space. For example, the sound profile of a bathroom may indicate the highest volume level that is appropriate or preferred within the bathroom. The user and/or the system may have created the sound profile for each space in the house that is to be used when recalibration is performed for that space. For example, a user may not want loud music while in the bathroom and as such set a predetermined volume level for recalibration when the user has relocated to the bathroom.

If a determination is made at block 1525 that the space to which the user has relocated has a sound profile, then at block 1540, the audio source in the first space may be recalibrated based on the second space's sound profile. This may include, for example, increasing the volume of the audio source in the first space, or otherwise controlling the audio source, such that the sound output can be heard at a desired level in the second space. If the second space is much farther away from or otherwise acoustically insulated or separated from the first space, then other factors may be considered prior to recalibrating sound in the first space. For example, to obtain a certain volume level in a space that is far away from the audio source, such as 50 meters away, in order for the sound to be heard at a desired level in the second space, the sound in the first space may need to be at a very high volume. However, if sound is recalibrated to the high volume for it to reach the desired level in the second space, it may be so loud that it may disturb people in other areas. As such, additional surroundings and circumstances may be automatically considered by the system prior to recalibrating to the sound profile of the second space.

If a determination is made at block 1525 that the space to which the user has relocated does not have a sound profile, then either one of the two options, option A or option B, at 1530 or 1535, may be selected and performed. In one embodiment, if option A is selected, then the sound from the audio source in the first space may be transmitted to a user device such that the first user can continue listening to the content even after leaving the space. This may be especially helpful when the first user has left the home entirely and can continue listening to the content that was being played in the first space on their device, or if there are others still in the first area and so sound is not recalibrated there. If option B is selected, then the audio source in the first space may be recalibrated to provide the same sound effect in the second space as achieved in the first space. For example, if while sitting in the first space, at the listening position, the first user was able to experience sound at a certain decibel level, then the volume of the sound will be increased such that the same decibel level can also be experienced in the second space where the user has relocated. In order to provide the same effect in the second space as in the first space, the system may use a spatial map of the entire house which includes distances between the space and any obstacles in between for the system to determine to what level must the volume be increased for it to provide the same effect in the second space as in the first space.

In some embodiments, if a determination is made at block 1510 that there are other users in the first space after the first user has left the first space, then, at block 1515 a recalibration will not be performed since other people are still in the first space and in addition the audio from the audio source may be transmitted to the first user's device, e.g., their mobile phone. As such, the sound in the first space may be played as is and the audio from the audio source may be transmitted to the user's mobile phone such that the user can continue listening to the audio even when away from the sound source.

Referring back to FIG. 15, the embodiments include determining whether to recalibrate based on the user interests and space profiles. For example, in some embodiments, a physical layout and a spatial sound map of a first space where the audio source is located may be generated. The generated physical layout may identify locations of one or more users and objects in the first space and spatial sound map may identify sound characteristics of sound propagated from the audio source for different locations in the first space. The generated physical layout and spatial sound map may be used to perform a baseline calibration for a first listening position. The first listening position may be associated with a first user located within the first space. In other words, the first listening position may be wherever the first user is located in the space and may be used for focusing the sound from the audio source to the location of the first user, such as to a position on a sofa in FIG. 1 where the user may be sitting. If a detection is made that the first user has left the first space where the audio source is located, which may be via camera monitoring the user's presence, movements, and gaze, a second determination may be made whether calibrate the sound for the first space. The second determination, in one embodiment, may be based on determining whether there is another user still in the room even after the first user has left the room. If so, calibration may not be done simply because one user, from the plurality of users, have left the room. A further determination may be if the user or users left in the room after the first user has left the room is/are interested in the sound propagated from the audio source, e.g., are they listening to the music, are they paying attention to it, or involved in another activity which, when analyzed by the system, can indicate a lack of interest in the sound produced. If a determination is made that other user or users left in the room are not interested in the audio, which may be gauged by monitoring their movements and gaze, then calibration may be performed to direct the sound to a second space, such as a bedroom where the first user may have relocated. Other considerations may be taken into account for calibrating sound characteristics to the new relocated space, e.g., a third space.

For example, a determination may be made whether calibrating sound from the sound source that is located in the first space such that the sound may be calibrate to a sound profile of the third space make the sound so loud or changes other characteristics of sound that exceed a threshold. If so, then instead of calibration, the audio may be transmitted to the first user's device, such as a smartphone for listening.

In some embodiments, once a determination has been made that the first user has left the first space and is currently located in a third space, such as a bedroom or another room in the house, then the system may determine a sound profile of the third space such that sound from the audio source can be adjusted for the user to be able to listen to the sound from the third space. For example, if the third space is a bedroom and its sound profile allows for certain sound characteristics, the same sound from the audio source in the first space may be adjusted, such as the music volume may be increased or certain instruments may be tuned, such that the used can enjoy it from the third space. In this embodiment, the listening position would be moved to the third space.

A determination may be made whether to calibrate the sound characteristics of sound propagated from the audio source based on the determined sound profile of the third space. These may include, would the sound be too loud, would it cause resonance, would others in other rooms of the house find it too loud, etc. The determination whether to calibrate the sound characteristics based on the determined sound profile of the third space include determining whether calibrating the sound characteristics based on the determined sound profile of the third space exceeds a sound threshold for the first space. If it does not exceed, then sound may be calibrated, if it does exceed, then sound may be transmitted to the user's phone or another speaker in the third space. In some instances, of the home has a centralized sound system where speakers are integrated into walls of the home in several rooms, the sound may be turned off in other rooms where the user is not located and may be tuned to the sound profile of the third space where the user is located.

In the embodiments discussed above, including embodiments discussed in relation to FIGS. 1-15, although a physical layout is used when calibrating, the embodiments are not so limited, and a spatial sound map may also be used instead (or in combination with) the physical layout. The spatial sound map may identify sound characteristics at different locations, such as in a confined or outdoor open space. The spatial sound map may then be used to perform the calibration, such as for example, a second spatial sound map, that is generated subsequent to the initial spatial sound map generated at the baseline calibration may indicate the differences in sound characteristics from the initial spatial sound map. Such differences in sound characteristic, if they exceed a threshold, may then be re-calibrated based on the new listening position or changes in environment, which may be obtained via the physical layout changes. The physical layout may be used to determine a location in the room, location in an outdoor open space, or listening position, to which the recalibration is to be directed such that optimal sound is delivered to the location or listening position.

In the embodiments discussed above, the term automatically relates to performing an action performed by the system or control circuitry 220 and/or 228 without user intervention, and without manually moving audio sources or selecting and adjusting one or more settings.

It will be apparent to those of ordinary skill in the art that methods involved in the above-mentioned embodiments may be embodied in a computer program product that includes a computer-usable and/or-readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

In some embodiments, the processes discussed above, such as in FIGS. 1, 4, 6, 8, 10, 13 and 15, have been described in a particular order or sequence. However, the embodiments are not so limited any other order or sequence, or repetition of steps, are also contemplated within the embodiments.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of calibrating sound characteristics of sound propagated from an audio source comprising:

generating a physical layout and a spatial sound map of a first space where the audio source is located, wherein the generated physical layout identifies locations of a plurality of users and objects in the first space and the spatial sound map identifies sound characteristics of sound propagated from the audio source for different locations in the first space;

performing, for a first listening position, a baseline calibration of sound propagated from the audio source based on the generated physical layout and spatial sound map, wherein the first listening position is associated with a first user of the plurality of users located within the first space;

detecting that the first user has left the first space where the audio source is located; and in response to detecting that the first user has left the first space and determining that at least a second user of the plurality of users remains, determining whether to perform a calibration, for a second listening position located in the first space associated with the second user, wherein the determination to perform the calibration for the second listening position is based on at least one criterion comprising an interest level of the second user in the sound propagated from the audio source.

2. The method of claim 1, wherein the criterion is related to presence of a second user in the first space after the first user has left the first space for a second space.

3. The method of claim 2, further comprising:

determining that the second user is present in the first space after the first user has left the space; and in response to determining that the second user is present in the space after the first user has left the space:

determining a location of the second user within the first space;

associating the determined location of the second user with the second listening position; and calibrating, for the second listening position, sound characteristics of sound propagated from the audio source based on the sound map and measurements of sound received at the second listening position.

4. The method of claim 2, further comprising:

determining, based on the interest level that the second user is interested in audio from the audio source; and calibrating sound characteristics of sound propagated from the audio source based on location of the second user and the sound map and measurements of sound received at the location of the second user in response to determining that the second user is interested in the sound propagated from the audio source.

5. The method of claim 2, further comprising:

determining, based on the interest level that the second user is not interested in audio from the audio source; and not performing the calibration based on determining that the second user is not interested in the sound propagated from the audio source.

6. The method of claim 4, wherein the interest of the second user in the audio from the audio source is determined based on monitoring the second user's gaze.

7. The method of claim 1, further comprising:

determining that the first user has left the first space and is currently located in a third space;

determining a sound profile of the third space; and determining whether to calibrate the sound characteristics of sound propagated from the audio source based on the determined sound profile of the third space.

8. The method of claim 7, wherein the determination whether to calibrate the sound characteristics based on the determined sound profile of the third space further comprises determining whether calibrating the sound characteristics based on the determined sound profile of the third space exceeds a sound threshold for the first space.

9. The method of claim 8, further comprising, performing the calibration in response to determining that calibrating the sound characteristics based on the determined sound profile of the third space does not exceed the sound threshold for the first space and not performing the calibration in response to determining that calibrating the sound characteristics based on the determined sound profile of the third space exceeds the sound threshold for the first space.

10. The method of claim 8, further comprising, in response to determining that calibrating the sound characteristics based on the determined sound profile of the third space exceeds the sound threshold for the first space, transmitting audio from the audio source to a device associated with the first user.

11. A system of calibrating sound characteristics of sound propagated from an audio source comprising:

communications circuitry configured to access the audio source; and control circuitry configured to:

generate a physical layout and a spatial sound map of a first space where the audio source is located, wherein the generated physical layout identifies locations of a plurality of users and objects in the first space and the spatial sound map identifies sound characteristics of sound propagated from the audio source for different locations in the first space;

perform, for a first listening position, a baseline calibration of sound propagated from the audio source based on the generated physical layout and spatial sound map, wherein the first listening position is associated with a first user of the plurality of users located within the first space;

detect that the first user has left the first space where the audio source is located; and in response to detecting that the first user has left the first space and determining that at least a second user of the plurality of users remains, determine whether to perform a calibration, for a second listening position located in the first space associated with the second user, wherein the determination to perform the calibration for the second listening position is based on at least one criterion comprising an interest level of the second user in the sound propagated from the audio source.

12. The system of claim 11, wherein the criterion is related to presence of a second user in the first space after the first user has left the first space for a second space.

13. The system of claim 12, further comprising, the control circuitry configured to:

determine that the second user is present in the first space after the first user has left the space; and in response to determining that the second user is present in the space after the first user has left the space:

determine a location of the second user within the first space;

associate the determined location of the second user with the second listening position; and calibrate, for the second listening position, sound characteristics of sound propagated from the audio source based on the sound map and measurements of sound received at the second listening position.

14. The system of claim 12, further comprising, the control circuitry configured to:

determine, based on the interest level that the second user is interested in audio from the audio source; and calibrate sound characteristics of sound propagated from the audio source based on location of the second user and the sound map and measurements of sound received at the location of the second user in response to determining that the second user is interested in the sound propagated from the audio source.

15. The system of claim 12, further comprising, the control circuitry configured to:

determine, based on the interest level that the second user is not interested in audio from the audio source; and not perform the calibration based on determining that the second user is not interested in the sound propagated from the audio source.

16. The system of claim 14, wherein the interest of the second user in the audio from the audio source is determined by the control circuitry based on monitoring the second user's gaze.

17. The system of claim 11, further comprising, the control circuitry configured to:

determine that the first user has left the first space and is currently located in a third space;

determine a sound profile of the third space; and determine whether to calibrate the sound characteristics of sound propagated from the audio source based on the determined sound profile of the third space.

18. The system of claim 17, wherein the determination whether to calibrate the sound characteristics based on the determined sound profile of the third space further comprises the control circuitry configured to determine whether calibrating the sound characteristics based on the determined sound profile of the third space exceeds a sound threshold for the first space.

19. The system of claim 18, further comprising, the control circuitry configured to perform the calibration in response to determining that calibrating the sound characteristics based on the determined sound profile of the third space does not exceed the sound threshold for the first space and not perform the calibration in response to determining that calibrating the sound characteristics based on the determined sound profile of the third space exceeds the sound threshold for the first space.

20. The system of claim 18, further comprising, in response to determining that calibrating the sound characteristics based on the determined sound profile of the third space exceeds the sound threshold for the first space, the control circuitry configured to transmit audio from the audio source to a device associated with the first user.

* * * * *